US010891647B2

(12) United States Patent
Gantert et al.

(10) Patent No.: US 10,891,647 B2
(45) Date of Patent: *Jan. 12, 2021

(54) INTELLIGENT PAYMENT FORMAT AND ATTRIBUTE PACKAGE TRANSACTION PROCESSING

(71) Applicant: JPMorgan Chase Bank, N.A., New York, NY (US)

(72) Inventors: Brian S. Gantert, Hockessin, DE (US); Joseph Arnone, Swedesboro, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 777 days.

This patent is subject to a terminal disclaimer.

(21) Appl. No.: 15/047,828

(22) Filed: Feb. 19, 2016

(65) Prior Publication Data

US 2017/0116635 A1  Apr. 27, 2017

Related U.S. Application Data

(63) Continuation-in-part of application No. 14/924,593, filed on Oct. 27, 2015, now Pat. No. 10,380,584.

(51) Int. Cl.
  *G06Q 20/32* (2012.01)
  *G06Q 30/02* (2012.01)
  (Continued)

(52) U.S. Cl.
  CPC ......... *G06Q 30/0226* (2013.01); *G06Q 20/10* (2013.01); *G06Q 20/204* (2013.01); *G06Q 20/3224* (2013.01); *G06Q 20/405* (2013.01)

(58) Field of Classification Search
  CPC ............. G06Q 30/0226; G06Q 20/405; G06Q 20/204; G06Q 20/10; G06Q 20/3224;
  (Continued)

(56) References Cited

U.S. PATENT DOCUMENTS 10,699,289 B1 *  6/2020  Dalton ................... H04W 4/80
2009/0287564 A1 * 11/2009  Bishop .................. G06Q 40/00
                                                705/14.38
(Continued)

OTHER PUBLICATIONS

DNB Working Paper, No. 196 / Dec. 2008, Wilko Bolt, Nicole Jonker and Corry van Renselaar, "Incentives at the counter: An empirical analysis of surcharging card payments and payment behaviour in the Netherlands", pp. 1-4 (Year: 2008).*

*Primary Examiner* — Kito R Robinson
*Assistant Examiner* — Tony P Kanaan
(74) *Attorney, Agent, or Firm* — Greenblum & Bernstein, P.L.C.

(57) ABSTRACT

Methods, non-transitory computer readable media, and transaction management computing devices that assist with processing a transaction involving a merchant and a user using a system include receiving over at least one communication channel an indication of a user transaction. Location information indicating a location of the user transaction or merchant information indicating a merchant involved in the user transaction is determined. A first attribute package and a first payment format is identified and communicated to the client device. The user transaction is initiated upon receiving a confirmation indicating selection of the identified first payment format and the identified first attribute package. The user transaction is held open for a predetermined period of time to allow the user to modify the selected first payment format or the selected first attribute package for the user transaction to a different attribute package or a different payment format.

20 Claims, 11 Drawing Sheets

(51) Int. Cl.
*G06Q 20/40* (2012.01)
*G06Q 20/20* (2012.01)
*G06Q 20/10* (2012.01)

(58) Field of Classification Search
CPC .............. G06Q 20/12; G06Q 30/0234; G06Q 30/0238; G06Q 30/0633; G06Q 20/227; G06Q 20/36; G06Q 20/3278; G06Q 20/102; G06Q 20/322; G06Q 20/367; G06Q 20/327; G06Q 20/22; G06Q 20/3823; G06Q 30/0601; G06Q 20/08; G06Q 20/14; G06Q 30/0261; G06Q 20/065; G06Q 20/351
See application file for complete search history.

(56) References Cited

U.S. PATENT DOCUMENTS

| | | | | |
|---|---|---|---|---|
| 2011/0320345 A1* | 12/2011 | Taveau | .............. | G06Q 20/3226 705/39 |
| 2013/0144707 A1* | 6/2013 | Isaacson | ............ | G06Q 30/0227 705/14.28 |
| 2013/0238455 A1* | 9/2013 | Laracey | ............... | G06Q 20/108 705/21 |
| 2013/0246203 A1* | 9/2013 | Laracey | ............... | G06Q 20/401 705/21 |
| 2013/0346173 A1* | 12/2013 | Chandoor | .............. | G06Q 40/02 705/14.17 |
| 2014/0279509 A1* | 9/2014 | Khilnani | ................ | G06Q 20/12 705/44 |
| 2015/0012425 A1* | 1/2015 | Mathew | ................ | G06Q 20/36 705/41 |
| 2015/0066691 A1* | 3/2015 | Ready | ................ | G06Q 20/3224 705/26.8 |
| 2015/0095133 A1* | 4/2015 | Parker | ................. | G06Q 20/202 705/14.38 |
| 2015/0193858 A1* | 7/2015 | Reed | ................. | G06Q 30/0633 705/26.8 |
| 2015/0332262 A1* | 11/2015 | Lingappa | ............. | G06Q 20/322 705/71 |
| 2016/0148185 A1* | 5/2016 | Andrews | .............. | G06Q 20/227 705/39 |
| 2016/0210626 A1* | 7/2016 | Ortiz | .................... | G06Q 20/023 |
| 2017/0017958 A1* | 1/2017 | Scott | .................. | G06Q 20/3265 |
| 2017/0032338 A1* | 2/2017 | Szollar | ............... | G06Q 30/0226 |
| 2017/0161728 A1* | 6/2017 | Satyanarayan | ........ | G06Q 20/42 |
| 2019/0340604 A1* | 11/2019 | Nadella | ................ | G06Q 20/227 |

* cited by examiner

INTELLIGENT PAYMENT FORMAT AND ATTRIBUTE PACKAGE TRANSACTION PROCESSING

RELATED APPLICATIONS

This application claims priority to and is a Continuation-in-part of U.S. patent application Ser. No. 14/924,593, filed on Oct. 27, 2015, entitled "Processing Transactions Using Convertible Optimized Attribute Packages." The application is incorporated herein in its entirety.

TECHNICAL FIELD

This disclosure generally relates to processing transactions and, more particularly, to processing transactions using op al payment methodology.

BACKGROUND

Customers often purchase products or services using a physical or virtual card, such as a debit or credit card, which may be tied to one or more accounts and/or one or more attribute packages of the customer. Some customers use a mobile application stored on a mobile device, such as a mobile phone, to make such purchases.

In the United States, customers may purchase products or services using a wide range of cards, including credit cards, store cards, bank cards. Each of these cards has very different attributes. For instance, the cards may carry different, and often varying, crest rates, provide different rewards and coupons for specific types of products and purchases, and have different payment cycles. With an average of three to four payments cards, U.S. consumers are frequently confronted with a decision as to which card to utilize in completing a purchase.

The consumer's decision is made ever difficult, as many financial institutions, merchants, and technology companies have developed their own unique methodology of completing a purchase. These different payment methods, sometimes referred to as payment formats, further complicate the purchasing decisions for consumers. Consumers must now not only determine which payment card to use but how to complete the purchase using the methodology supported by the chosen card.

SUMMARY OF EXAMPLE EMBODIMENTS

In one embodiment, a system is disclosed that includes at least one computer processor and non-transitory computer memory storing at least executable computer instructions, the non-transitory computer memory including at least one database storing at least merchant data and user data. The computer processor executes executable computer instructions to perform various operations, including receiving, over at least one communication channel, an indication of a user transaction. In response to receiving, over at least one communication channel, an indication of a user transaction, the at least one computer processor is automatically activated to determine location information indicating a location of the transaction or merchant information indicating the merchant involved in the transaction. The processor further selects and retrieves a first attribute package selection code module and a first payment format selection code module for execution. The computer processor may then execute the first attribute package selection code module to identify a first attribute package of a plurality of attribute packages of the user, and execute the first payment format selection code module to identify a first payment format of a plurality of payment format. In various embodiments, the selection of the first attribute package or the selection of the payment format is made based on at least one on one or more customized rules associated with the user and location or merchant information. Furthermore, the computer processor communicates to a client system an instruction to identify the selected first attribute package and payment format as a recommendation to the user. In response to receiving a confirmation of the selected first payment format and the selected first attribute package, the computer processor automatically pens the transaction, and holds the transaction open for a predetermined period of time to allow the user to modify the payment attribute package or payment format for the transaction to a different attribute package of the plurality of attribute packages or payment format.

DESCRIPTION OF EXAMPLE EMBODIMENTS

Figure 1:
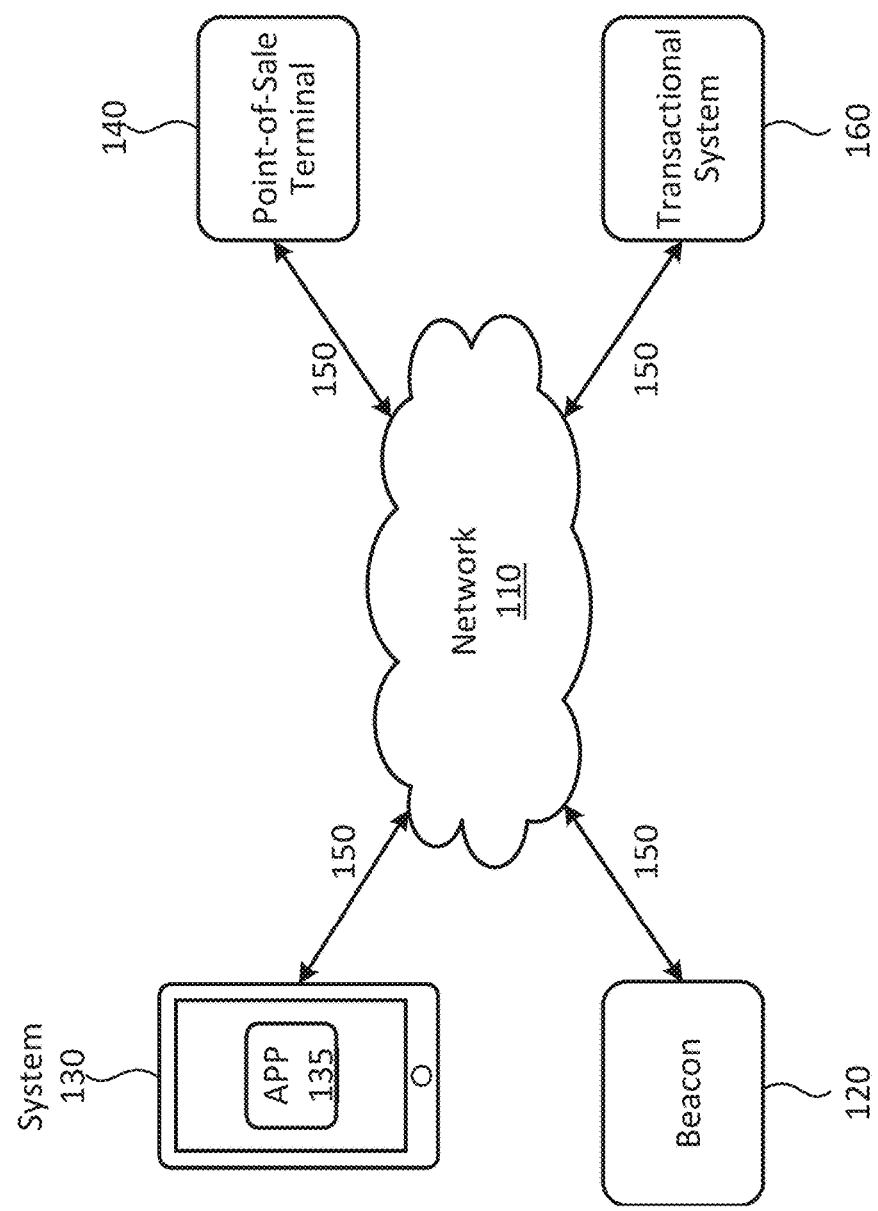
FIG. 1 illustrates an example network environment associated with a transactional system in accordance with an embodiment of the present invention.

A customer's attribute package may have one or more accounts linked to multiple attribute packages, and each of the attribute packages may be accessed by the user via a single payment method (e.g., a physical or virtual card linked to multiple attribute packages). The user may initiate a transaction for the purchase of a good or service by providing the payment method, for example, at a point-of-sale terminal. The user may then select, at the point-of-sale terminal, which of the multiple, linked attribute packages to which the transaction should be charged (e.g., debit or credit). Certain embodiments of the present disclosure provide an ability to determine for the customer which of the multiple attribute packages—or which combination of the multiple attribute packages—would present the highest value to the customer if applied to the transaction and to suggest an attribute package to be used for the transaction. Certain embodiments may provide the customer with a post-transaction window of time to review and modify the payment attribute package for the transaction. These and other concepts are described in greater detail below in the context of example embodiments of the present disclosure.

Particular embodiments provide methods and systems for processing a transaction initiated by a user at, for example, a point-of-sale terminal in a third-party store. The user may provide, for payment, a single payment method connected to more than one attribute package. A transactional system may determine and provide as a recommendation to the user, which of the user's multiple attribute packages would provide the greatest value to the user (e.g., in cash-back or rewards points) if used to process the transaction. The determination of the recommended payment attribute package may be based on location information of a transaction (e.g., information indicating that the user is at a particular store or geographic location), if received by the transactional system. For example, the transactional system may determine a particular retail store credit-card attribute package may be the best attribute package for the user to apply to a transaction at the particular retail-store, and the transactional system may determine that the user is transacting at the particular retail-store based on received location information.

The transactional system may open the transaction, setting the payment attribute package to the recommended payment attribute package. The transactional system may then hold the transaction open for a predetermined window of time in order to allow the user to modify the payment attribute package from the recommended payment attribute package to a different one of the user's multiple attribute packages. The user may be prompted, by an application running on a client system of the user, the application communicating with the transactional system, to confirm the recommended payment attribute package or to select an alternate payment attribute package. The user may also be prompted to set a reminder to review the pending transaction at a time during the window of time in which it is being held open in order to potentially modify the payment attribute package to a different attribute package than the recommended payment attribute package.

FIG. 1 illustrates an example network environment 100 associated with a transactional system. Network environment 100 includes a beacon 120, a client system 130, a point-of-sale terminal 140, and a transactional system 160, connected to each other by a network 110. Although FIG. 1 illustrates a particular arrangement of beacon 120, client system 130, point-of-sale terminal 140, transactional system 160, and network 110, this disclosure contemplates any suitable arrangement of beacon 120, client system 130, point-of-sale terminal 140, transactional system 160, and network 110. As an example, two or more of beacon 120, client system 130, point-of-sale terminal 140, transactional system 160 may be connected to each other directly, bypassing network 110. As another example, two or more of beacon 120, client system 130, point-of-sale terminal 140, transactional system 160 may be physically or logically co-located with each other in whole or in part. Moreover, although FIG. 1 illustrates a particular number of beacons 120, client systems 130, point-of-sale terminals 140, transactional systems 160, and networks 110, this disclosure contemplates any suitable number of beacons 120, client systems 130, point-of-sale terminals 140, transactional systems 160, and networks 110. As an example, network environment 100 may include multiple beacons 120, client systems 130, point-of-sale terminals 140, transactional systems 160, and networks 110. Additionally, although network environment 100 is illustrated and described as including particular components, this disclosure contemplates network environment 100 being implemented using any suitable combination of components.

This disclosure contemplates any suitable network 110. As an example, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect beacon 120, client system 130, point-of-sale terminal 140, and transactional system 160 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH) links. In particular embodiments, one or more links 150 each include an ad hoc network, an intranet, an extranet, a VPN a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, beacon 120 may be a geographic-positioning-capable device or system associated with a third party. As used herein, beacon 120 may be any static or dynamic device suitable for communicating wirelessly with any number of client systems 130 proximate to the beacon 120. Beacon 120 may be communicatively-coupled to a third-party and able to communicate wirelessly with transactional system 160. Beacon 120 may be able to communicate wirelessly with point-of-sale terminal 140. Beacon 120 may send and receive wireless communications via, for example, radio-frequency identification, near-field communication, ultrasonic waves, BLUETOOTH, BLUETOOTH low energy, IBEACON protocols, EDDYSTONE protocols, or any other suitable wireless communication method, particularly short-range wireless communication methods. A third-party may be associated with multiple beacons 120, and each beacon may be fixed, removably or permanently, at a location within a place of the third-party. For example, the third-party may be a merchant, and there may be multiple beacons 120 dispersed throughout a store of the merchant. Although this disclosure describes beacons 120 in a particular manner, this disclosure contemplates any suitable beacons 120 for wirelessly communicating with one or more client system 130.

In particular embodiments, client system 130 may be an electronic device including hardware, software, or embedded logic components or a combination of two or more such components and capable of carrying out the appropriate functionalities implemented or supported by client system 130. As an example, a client system 130 may include a computer system such as a desktop computer, notebook or laptop computer, netbook, a tablet computer, ebook reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include an application 135. Application 135 may be any suitable application associated with transactional system 140. Application 135 may be a native application running on client system 130. Application 135 may facilitate user-initiated transactions between an attribute package of the user and a third-party (e.g., a merchant). Application 135 may communicate wirelessly with point-of-sale terminal 140 and transactional system 160. Application 135 may be launched by user input at an interface of client system 130 or automatically based on settings (e.g., set by the user at client system 130). As an example, application 135 may be automatically launched (e.g., running in the background on client system 130) in response to a communication from a beacon 120, point-of-sale terminal 140, or transactional system 160. As another example, point-of-sale terminal 140 may send a notification to application 135 that a user has initiated a transaction at point-of-sale terminal 140 (e.g., using a card associated with transactional system 160), and the notification may cause client system 130 to launch application 135. Application 135 may be capable of providing prompts and any other suitable notifications for display to the user on an interface of client system 130.

In particular embodiments, point-of-sale terminal 140 may be any suitable computing system for communicating with transactional system 160 to open, close, and process a transaction. In particular embodiments, point-of-sale terminal 140 may be a beacon 120. In particular embodiments, point-of-sale terminal 140 may be communicatively coupled to one or more beacons 120. Point-of-sale terminal 140 may comprise one or more interfaces for receiving a user's payment credentials (e.g., a credit-card reader). Point-of-sale terminal 140 may be able to communicate wirelessly either directly or via network 110 with beacon 120, client system 130, and transactional system 160. As an example, point-of-sale terminal 140 may be able to communicate with client system 130 (e.g., via BLUETOOTH, near-field communication, or any other suitable short-range radio frequency signal) to obtain payment credentials of the user stored on client system 130 (e.g., by application 135).

In particular embodiments, transactional system 160 may be a network-addressable computing system that can host an online transactional system. Transactional system 160 may be accessed by the other components of network environment 100 either directly or via network 110. As an example, client system 130 may access transactional system 160 using a web browser or native application (e.g., application 135) either directly or via network 110. In particular embodiments, transactional system 160 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof.

In particular embodiments, each server may include hardware, software, or embedded logic components or a combination of two or more such components for carrying out the appropriate functionalities implemented or supported by the server. In particular embodiments, transactional system 160 may include one or more data stores. Data stores may be used to store various types of information. In particular embodiments, the information stored in the data stores may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable beacon 120, client system 130, point-of-sale terminal 140, and transactional system 160 to manage, retrieve, modify, add, or delete, the information stored in the data stores.

Figure 2:
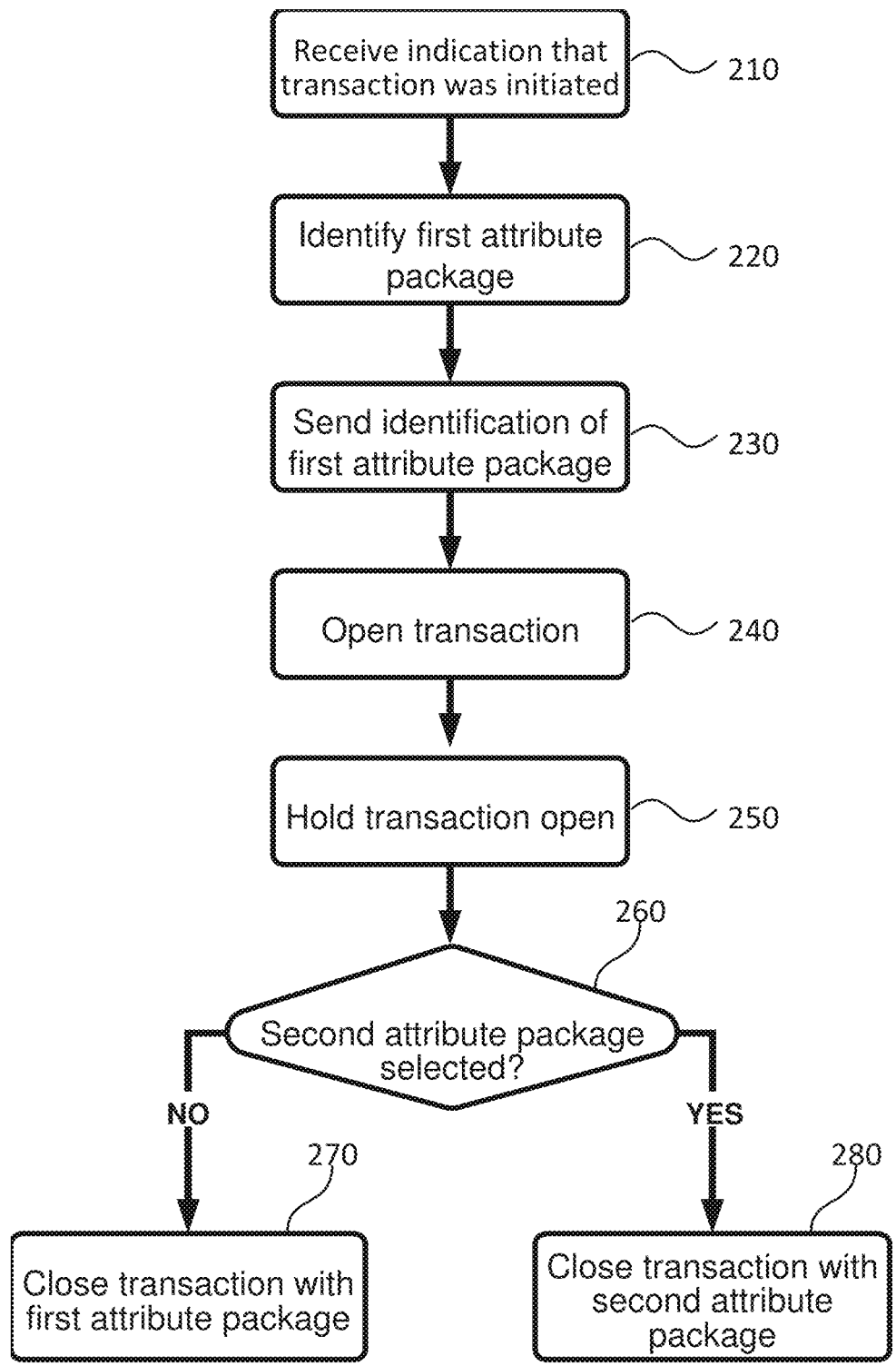
FIG. 2 is a flowchart illustrating an example method for processing a transaction in accordance with an embodiment of the present invention.

FIG. 2 is a flowchart 200 of illustrative steps for processing a transaction. In particular embodiments, the steps of flowchart 500 may be implemented by one or more computing devices of transactional system 160. In particular embodiments, the steps of flowchart 500 may be implemented in order to process a transaction, which may correspond to, as an example, a transaction between a user and a third-party (e.g., a merchant). At step 210, transactional system 160 receives an indication that a transaction was initiated. The indication may be sent from, as an example, one or more beacons 120, point-of-sale terminal 140, or application 135 running on client system 130. As an example, application 135 may be launched in response to user input received at client system 130 or in response to the transaction being initiated by a user of client system 130 at point-of-sale terminal 140; application 135 may receive details of the transaction from point-of-sale terminal 140; and application 135 may send to transactional system 160 an indication that the transaction was initiated. In particular embodiments, the indication that the transaction was initiated may include price information prices for each of the products to be purchased, taxes, a sub-total price, and a total price), product information (e.g., an identification of each of the products or services that are subjects of the transaction), merchant information (e.g., an identification of the merchant or third-party with whom the transaction is being initiated), and any other suitable information regarding the transaction.

In particular embodiments, the user may initiate the transaction by providing payment credentials to a third party (e.g., a merchant), and payment credentials may be associated with a plurality of attribute packages. As an example, the user may swipe a payment card, and the payment card may be connected to multiple possible payment attribute packages of the user. As used herein, "payment card" refers any suitable product, hardware, software, or any combination thereof, by which a transaction may be initiated and access granted to one or more attribute packages connected to the payment card. The attribute packages may each be associated with transactional system 160. The attribute packages may include, as an example, debit attribute packages, credit attribute packages, rewards attribute packages, loyalty-point attribute packages, gift-card attribute packages, any other suitable types of payment attribute packages, or any combination thereof. Each attribute package may be associated with particular benefits (e.g., rewards points), protections (e.g., fraud protection, one or more payment lines (e.g., credit, debit, and prepaid lines), fees (e.g., annual or monthly account maintenance fees any other suitable features, or any combination thereof. The payment card may have a combined credit limit based on the credit limits of multiple credit attribute packages connected to the payment card (e.g., a sum of the credit limits or another suitable combination of the credit limits).

In response to the received indication that the user has initiated a transaction, at step 520, transactional system 160 identifies a first attribute package of a plurality of attribute packages of the user based on one or more customized rules associated with the user. In particular embodiments, the first attribute package may be the optimal attribute package for the transaction based on the value to the user as determined by transact system 160. Value to the user may be based on provision to the user of information regarding the transaction, including, for example, purchase information (e.g., purchase amount, item/SKU level details of purchase, date/time of transaction), a merchant category (e.g., domestic/international merchant, product type sold by merchant, or any other suitable merchant category), a purchase category (e.g., in-store/online purchase, recurring purchase/payment, or any other suitable purchase category), and any other suitable information regarding the transaction. Value to the user may also be based on, for example, rewards value for the transaction, annual percentage rate (APR), transaction fees (e.g., foreign exchange fees), transactional rewards (e.g., one point per dollar spent), non-transactional bonus rewards (e.g., spend $10,000, get 1,000-point bonus, earn 7% annual bonus, or quarterly bonuses and caps on quarterly bonuses), predicted impact on credit score (e.g., FICO score), credit line availability, insurance, price-purchase protection, merchant specific benefits (e.g., free checked bag when using particular attribute package in transaction with a particular airline), any other suitable benefit or value, or any combination thereof. The customized rules may include, as an example, rules based on user attributes (e.g., user preferences), attributes of each of the attribute packages, attributes of the hind party with whom the user is transacting, transaction-specific attributes (e.g., attributes of a product to be purchased, including, for example, price comparison information), any other suitable factors for determining which of the user's attribute packages would bring the most value to the user for the particular transaction, or any combination thereof. For example, transactional system 160 may use a customized rule based on a comparison of the price of a product at a store at which the user is currently located to the price of the product at a different store (e.g., at another brick- and mortar store or at an online retailer) to provide a recommendation to the user to purchase the product at the different store using a particular attribute package as the purchase at a different store would be more valuable to the user (e.g., the different store is offering a price discount for the product if purchased using a particular attribute package). Customized rules may include, as an example, greatest rewards value for the transaction, lowest APR, rules associated with any other value, convenience or attribute associated with an attribute package, or any combination thereof. Any suitable combination of customized rules may be used to identify a first attribute package for recommendation to the user. For example, the customized rules used may include one or more rules set by transactional system 160 and one or more rules based on user preferences (e.g., user preference may indicate that a particular attribute package should always be used at a particular place). In another example, a user may set rules based on his customer preferences as the default rules to be applied in identifying a first attribute package.

Transactional system 160 may rank the customized rules using any suitable technique. For example, the customized rules may be ranked based on user preferences (e.g., a default set of customized rules may be set based on user preferences). User preferences may be stored by application 135 running on client system 130, transactional system 160, or both. Transactional system 160 may then determine which of the customized rules to apply based on the rankings. In particular embodiments, transactional system 160 may determine weights to assign to the rules based on the rankings and may apply, as an example, a weighted combination of the rules in order to identify the first attribute package. Any type of process or algorithm may be employed for assigning, combining, averaging, and performing any other suitable operation on the rankings for each factor and the weights assigned to the factors. In particular embodiments, transactional system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

Transactional system 160 may identify the first attribute package using any suitable technique. As an example, the user may specify in preferences (e.g., via a webpage associated with transactional system 160 or via application 135 running on client system 130) that he prefers to use the attribute package that would earn him the highest number of rewards points for the transaction relative to the other attribute packages of the user. In the same example, a first attribute package of the user may be associated with the highest rewards for the transaction, and a second attribute package of the user may be associated with the lowest APR. Transactional system 160 may identify the first attribute package as the recommended payment attribute package based on the user-specified preference for the attribute package providing the highest rewards over that providing the lowest APR.

In particular embodiments, transactional system 160 may determine whether or not location information indicating a location of the transaction was received. As an example, the location information may indicate a geographic location of client system 130 (e.g., a global positioning system location), a type of third-party location (e.g., a construction store chain), a particular one of a type of third-party location (e.g., the particular construction store on Frankford Avenue), or any other suitable location information. In particular embodiments, the location information may be received from application 135 running on the client system 130, one or more short-range radio frequency devices proximate to the client system 130 (e.g., beacons 120), point-of-sale terminal 140, or any combination thereof.

Location information may be sent to transactional system 160 at any suitable time. As an example, location information may be sent by one or more beacons 120 to transactional system 160 when the user's client system 130 is confirmed to be in a range of the one or more beacons 120. As another example, location information may be sent by point-of-sale terminal 140 at the point-of-sale (e.g., when the user has initiated the transaction by providing payment credentials). Location information may also be sent to transactional system 160 when a user "checks in" at a particular place via an application running on client system 130 (e.g., a social media applications), taps a near-field communication device at a particular place (e.g., using client system 130), scans a Quick Response (QR) code at a particular place (e.g., using client system 130), interacts with or comes within a particular range of a kiosk at a particular place, or any other suitable technique for determining location information of the user. Whether or not the location information is received by transactional system 160 may depend, as an example, on whether client system 130 has sufficient mobile-network service, sufficient wired or wireless internet connectivity, or both; on whether client system 130 is in range of and able to wirelessly communicate with any other suitable devices proximate to client system 130 (e.g., one or more beacons 120 and/or point-of-sale terminal 140); and on whether the location and/or BLUETOOTH capabilities of client system 130 are turned on. In particular embodiments, a user may be initiating a transaction with a merchant online, and no location information may be received at transactional system 160. When no location information is received at transactional system 160, information regarding the transaction may be sent to transactional system 160 at the point-of-sale (e.g., by point-of-sale terminal 140 or other suitable third-party system). If the location information has been received, transactional system 160 may identify the first attribute package additionally based on the location information. As an example, the location information may indicate that the user is at a particular sporting-equipment store, and transactional system 160 may then determine that the optimal attribute package to use would be an attribute package that is linked to a rewards attribute package associated with the sporting-equipment store.

Figure 3:
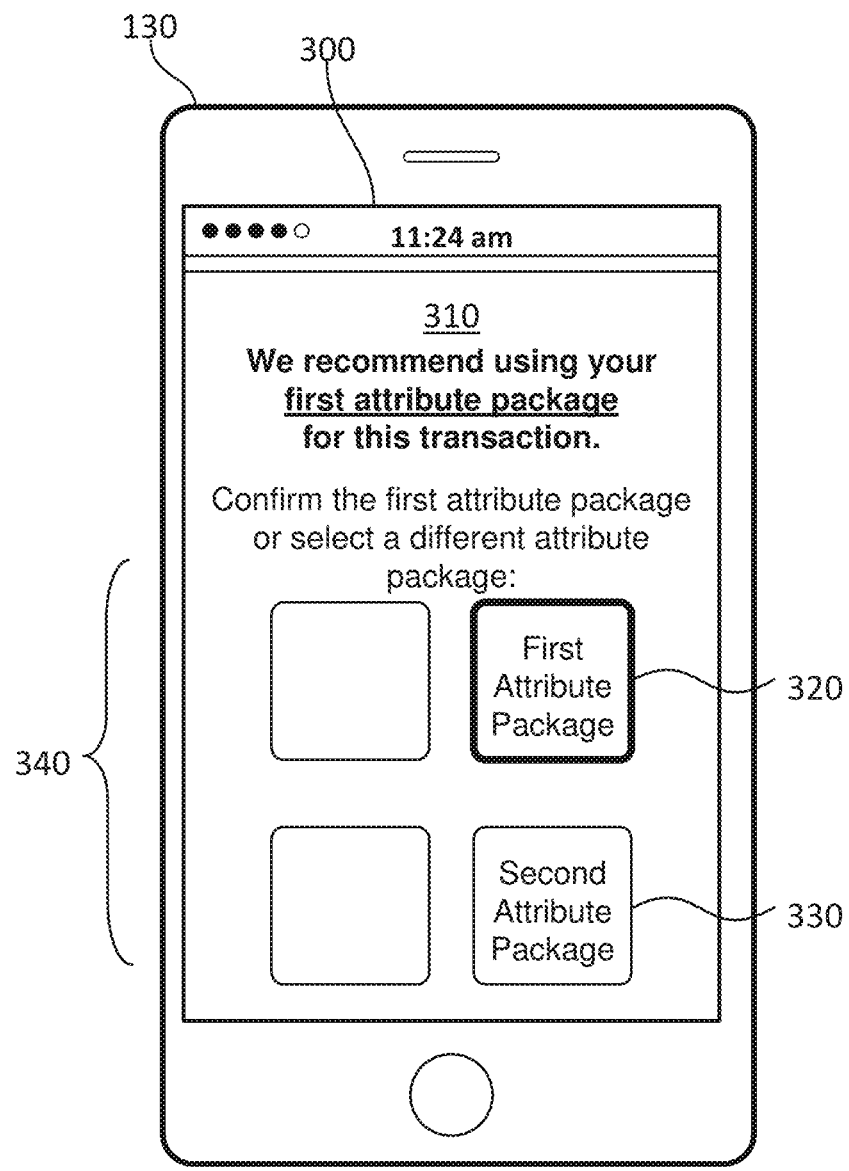
FIG. 3 illustrates an example prompt provided at an interface of a client system in accordance with an embodiment of the present invention.
Figure 4:
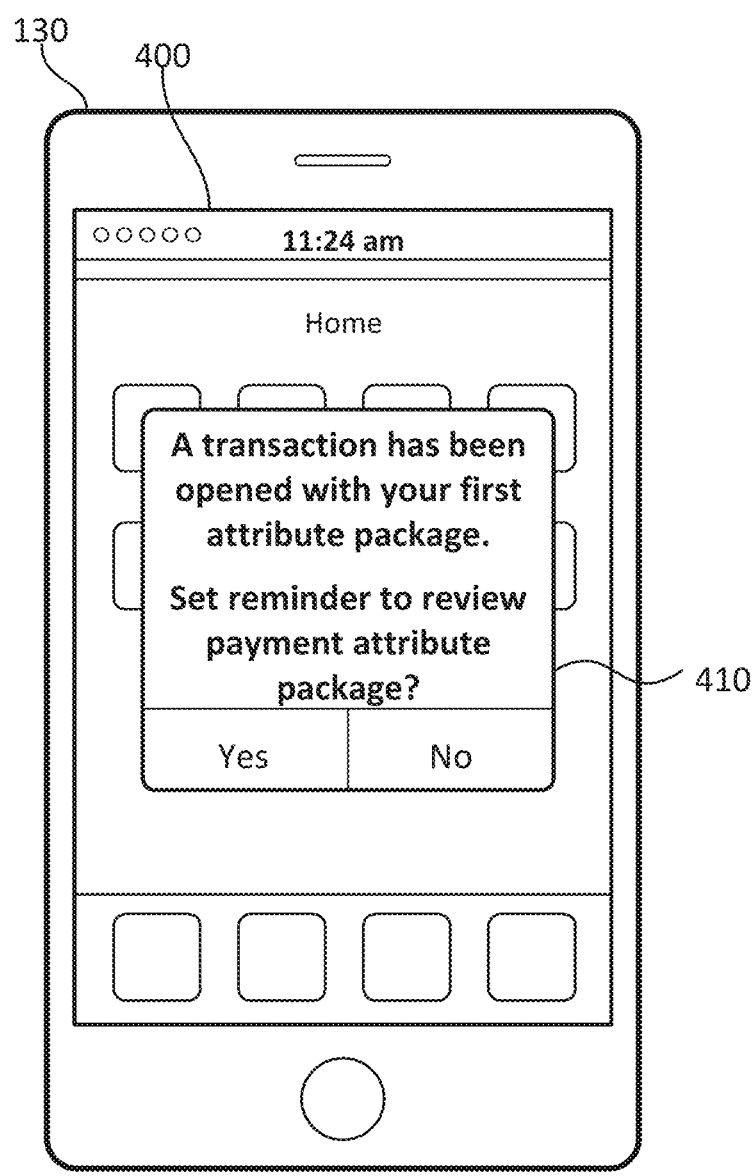
FIG. 4 illustrates an example prompt provided at an interface of a client system in accordance with an embodiment of the present invention.

After the first attribute package 1 as been identified as the recommended payment attribute package for the transaction, transactional system 160 may proceed to step 230 and send an identification of the first attribute package to client system 130 of the user as a recommended payment attribute package for processing the transaction. In particular embodiments, transactional system 160 may send instructions to application 135 running on client system 130 to provide a prompt for display to the user, and the prompt may include the identification of the first attribute package as the recommended payment attribute package for processing the transaction. FIGS. 3 and 4, which are described below, provide example prompts, which may be displayed at an interface of client system 130 or at an interface of point-of-sale terminal 140.

In particular embodiments, as an example, when the location information is received (i.e., client system 130 has service or internet connectivity), the prompt may include a real-time request to confirm the identified first attribute package as the payment attribute package for the transaction or to select a different attribute package of the user's attribute packages as the payment attribute package with which to process the transaction. In particular embodiments, as an example, when the location information is not received (i.e., client system 130 has no or limited service or internet connectivity or the user is transacting online), the prompt may be pushed to client system 130 by one or more beacons 120, point-of-sale terminal 140, or any combination thereof. The prompt may also be pushed to and displayed at point-of-sale terminal 140. In the same example, the prompt may include a notification of the recommended payment attribute package and that the transaction has been initiated. In particular embodiments, the prompt may also include a selectable element or tool by which the user may set a reminder for the user to modify the payment attribute package for the transaction at a later time. As an example, the reminder may be an alarm on client system 130 or a notification displayed to the user at client system 130 by application 135 (e.g., a push notification).

In response to the identification of the first attribute package in step 220, at step 240, transactional system 160 may open the transaction. The payment attribute package for the transaction may be set to the first attribute package, which is the recommended payment attribute package. The transaction may be pending until closed. After the transaction has been opened, transactional system 160 may proceed to step 250 and hold the transaction open (i.e., pending) for a predetermined period of time to allow the user to modify the payment attribute package for the transaction to a different attribute package of the plurality of attribute packages. During the predetermined period of time, the user of client system 130 may change the payment attribute package, which may be set to the first attribute package, which is the recommended payment attribute package, in step 240. As an example, the user may input a response at client system 130 to one or more of the prompts described in connection with step 230 in order to modify the set payment attribute package for the transaction. In particular embodiments, the user may modify the set payment attribute package using application 135 running on client system 130 (e.g., by interacting with a push notification generated by application 135), via a webpage associated with transactional system 160, which may be accessed by client system 130, or by sending an email to transactional system 160 (e.g., via client system 130). In particular embodiments, the user may modify the set payment attribute package for the transaction via a webpage associated with transactional system 160, application 135 running on client system 130, point-of-sale terminal 140, one or more beacons 120, any other suitable method of communicating with transactional system 160, or any combination thereof. In particular embodiments, the user may modify the set payment attribute package by contacting customer service associated with transactional system 160 (e.g., by phone or at a physical branch location), using automated voice response unit (VRU), using interactive notifications (e.g., push alerts, text messages) received at client system 130, or using any other secure channels to modify the set payment attribute package.

Iii particular embodiments, the length of time that the transaction is held open in step 250 may be determined by transactional system 160 based on one or more attributes of the user, one or more attributes of the transaction, one or more attributes of the third-party with whom the user is transacting, any other suitable factors, or any combination thereof. Transactional system 160 may determine the length of the predetermined period of time based on the credit score of the user. As an example, a user with a lower credit score may have be given a shorter period of time (e.g., 5 hours) in which the payment attribute package may be modified, as opposed to a user with a higher credit score, who may be given a longer period of time in which the payment attribute package may be modified (e.g., 12 hours). Transactional system 160 may determine the length of the predetermined period of time based on one or more attributes of the particular third party with whom the user is transacting. As an example, transactional system 160 may set the predetermined period of time as a shorter window for certain third parties and a longer window for other third parties based on the requirements of the respective third parties. Transactional system 160 may determine the length of the predetermined period of time based on one or more attributes of the particular payment attribute package. As an example, certain payment attribute packages may have requirements that allow the transaction to be pending for a shorter time period before it is either closed or cancelled.

At the end of the predetermined period of time in step 250, transactional system 160 may proceed to step 260 and determine whether the user made a selection of a second attribute package (i.e., a different attribute package than the first attribute package from the plurality of attribute packages of the user) as the payment attribute package for the transaction during the predetermined period of time. In particular embodiments, transactional system 160 may receive an indication that the user selected a second attribute package—or confirmed the first attribute package—at any time during the predetermined period of time. Transactional system 160 may receive this indication from, as an example, application 135 running on client system 130. If it is determined that a second attribute package was not selected at step 270, then transactional system 160 may proceed to step 280 and close the transaction, processing the transaction with the first attribute package. If it is determined that a second attribute package was selected at step 260, then transactional system 160 may proceed to step 280 and close the transaction, processing the transaction with the selected second attribute package.

Transactional system 160 may close the transaction upon determining that a second attribute package has been selected by the user (e.g., inputted by the user at application 135 running on client system 130) or may continue to hold the transaction open for further modification of the payment attribute package until the expiration of the predetermined period of time. As an example, the user may input, at application 135 running on client system 130, a selection of a second attribute package of the plurality of attribute packages of the user as the payment attribute package for the transaction instead of the recommended first attribute package, and transactional system 160 may close the transaction, processing the transaction with the second attribute package, as soon as it receives the user's selection of the second attribute package from application 135. In the same example, transactional system 160 may receive the selection of the second attribute package from application 135 during the predetermined period of time and may wait until the period of time expires before closing the transaction with the second attribute package.

In particular embodiments, transactional system 160 may generate a report for delivery to the user. The report may be generated at a predetermined frequency (e.g., yearly or monthly). The report may include, as an example, information regarding the benefits or conveniences of the attribute packages of the user, a summary of the utilization of each attribute package by the user, an assessment of the value each attribute package provides to the user, and one or more recommendations as to which attribute packages the user should keep or cancel and new attribute packages for which the user should apply, any other suitable transactional information, any combination thereof. Transactional system 160 may make recommendations in the report based on the user's historical use of the attribute packages, transactions made (e.g., spending trends), third parties transacted with, location information of the transactions, benefits or value accrued over time based on transactional system 160's recommendations (e.g., additional rewards earned, benefits received, and fees or interest saved), the user's credit profile, user's household information (e.g., household income, historical use of attribute package information for one or more members of the user's household), any other suitable factors, or any combination thereof. In particular embodiments, a report may be generated ad hoc with each transaction. For example, after a transaction is initiated and a particular payment attribute package has been recommended, a report may be generated that provides, to the user, the logic behind the recommendation e.g., top three reasons why a particular payment attribute package was recommended over other possible attribute packages).

In particular embodiments, a user may be able to access a user profile, which may include, for example, attribute packages available to the user and the particular values or benefits associated with each attribute package (e.g., rewards information or APR information, as described above), spend history for each attribute package, customer account information (e.g., address or change in address), customer account status (e.g., lost or stolen card, fraudulent transaction reported), information pertaining to other users on the account (e.g., authorized users or joint users), tools for adding/deleting attribute packages, configurable user preferences (e.g., selection of particular attribute packages to use in particular scenarios or at particular merchants), any other suitable profile information, or any combination thereof. A user may access his profile, for example, via application 135 running on client system 130.

Particular embodiments may repeat one or more steps of the method of FIG. 2, where appropriate. Although this disclosure describes and illustrates particular steps of the method of FIG. 2 as occurring in a particular order, this disclosure contemplates any suitable steps of the method of FIG. 2 occurring in any suitable order. Moreover, although this disclosure describes and illustrates particular components, devices, or systems carrying out particular steps of the method of FIG. 2, this disclosure contemplates any suitable combination of any suitable components, devices, or systems carrying out any suitable steps of the method of FIG. 2. Although this disclosure describes and illustrates particular embodiments of FIG. 2 as being implemented by transactional system 160, this disclosure contemplates any suitable embodiments of FIG. 2 as being implemented by any suitable platform or system. As an example, particular embodiments of FIG. 2 may be implemented by client system 130. Furthermore, although this disclosure describes and illustrates particular components, devices, or systems carrying out particular steps of the method of FIG. 2, this disclosure contemplates any suitable combination of any suitable components, devices, or systems carrying out any suitable steps of the method of FIG. 2.

FIG. 3 illustrates an example prompt 310 provided at an interface 300 of a client system 130. In particular embodiments, transactional system 160 may send instructions to application 135 running on client system 130 to display prompt 310 to the user of client system 130. In particular embodiments, transactional system 160 may send instructions to point-of-sale terminal 140 to display prompt 310 to the user. In the illustrated embodiment of FIG. 3, client system 130 is depicted as having ample mobile-network service, by which location information of the user may be determined and sent to transactional system 160. Accordingly, prompt 310 may be provided at, before, or after the point-of-sale. Prompt 310 may include, as shown in FIG. 3, a recommended attribute package—first attribute package 320—which may be preselected by transactional system 160 out of multiple attribute packages 340 of the user as the payment attribute package for a particular user-initiated transaction. Prompt 310 may additionally include instructions to the user to confirm first attribute package 320 as the payment attribute package or to select a different attribute package of multiple attribute packages 340 of the user.

The user may select, via interface 300 of client system 130, second attribute package 330 for processing the transaction. As described above in connection with FIG. 2, transactional system 160 may either close the transaction, processing it with the user-selected second attribute package 330, or hold the transaction open for a window of time to allow for further user modification of the payment attribute package (e.g., the user may revert his selection to first attribute package 320 or select a third attribute package). In particular embodiments, no user input may be received at interface 300 of client system 130, and transactional system 160 may hold the transaction open for the window of time and then close the transaction using first attribute package 320.

As an example, transactional system 160 may preselect first attribute package 320, which may be a retail-store credit-card account, based at least in part on location information indicating that the user has initiated a transaction at the particular retail-store location. The user may determine, however, that he would rather apply a different attribute package—second attribute package 330—which may be an airline rewards attribute package that requires a certain dollar amount of qualifying purchases be made each quarter. Transactional system 160 will then apply the second attribute package 330 to the transaction, even though the value to the user may have been greater if the first attribute package 320 had been applied to the transaction. As described in connection with FIG. 2, transactional system 160 may employ any suitable machine-learning algorithms or heuristics to determine the recommended payment attribute package (i.e., first attribute package 320) based on past user behavior (e.g., selecting the airlines reward card when a quarterly-purchase amount is close to being met or selecting the airlines reward card at the particular retail-store location). Thus, the next time the user is transacting at the particular retail-store location, transactional system 160 may determine a different recommended payment attribute package (e.g., the airline-rewards attribute package) based on past user behavior. In particular embodiments, transactional system 160 may modify its recommended payment attribute package (i.e., modify the backend logic) in response to the user, as an example, modifying the recommended payment attribute package from first attribute package 320 to second attribute package 330 at the same retail-store location a certain amount of times within a certain time period (e.g., five times in a month).

Although prompt 310 is described in a particular manner herein, prompt 310 may be represented in any suitable manner and generated using any method or technique. Although prompt 310 is depicted and described as presenting a particular number of attribute packages of the user, it will be understood that this is for illustrative purposes, not by way of limitation, and that prompt 310 may present any suitable number of attribute packages of the user. It will further be understood that prompt 310 is depicted as providing certain information for illustrative purposes, not by way of limitation, and that prompt 310 may provide any other suitable information related to the transaction including, as an example, a countdown of time until the predetermine period of time expires, information about the multiple attribute packages of the user (e.g., APR information, balances, payment due dates, rewards balances, and deep links to more detailed information about each attribute package), information regarding the recommendation (e.g., the first attribute package has the lowest APR), any other suitable information regarding the transaction, or any combination thereof. It will further be understood that prompt 310 is depicted as having features (e.g., selectable elements for each payment attribute package) but this is illustrative purposes, and prompt 310 may use any suitable static and/or dynamic features for presenting information or providing attribute packages for selection. As an example, prompt 310 may provide a tool that permits the user to drag or slide a transaction into a particular, selected attribute package of multiple attribute packages 340. It will further be understood that prompt 310 is depicted as being presented at an interface of application 135 running on client system 130, this if for illustrative purposes, not by way of limitation, and prompt 310 may be any suitable notification presented in any suitable way at client system 130. As an example, prompt 310 may be presented on a lock screen, a home screen, hovering over an interface of a different application (e.g., a push notification), or on an interface of application 135, and prompt 410 may be silent or accompanied by audible, tactile, or other suitable feedback. Prompt 310 may also be displayed at and interacted with via point-of sale terminal 140.

Although this disclosure describes and illustrates particular embodiments of FIG. 3 as being implemented by client system 130, this disclosure contemplates any suitable embodiments of FIG. 3 as being implemented by any suitable platform or system. As an example, particular embodiments of FIG. 3 may be implemented by transactional system 160. Furthermore, although this disclosure describes and illustrates particular components, devices, or systems carrying out particular steps of the method of FIG. 3, this disclosure contemplates any suitable combination of any suitable components, devices, or systems carrying out any suitable steps of method of FIG. 3.

FIG. 4 illustrates an example prompt 410 provided at an interface 400 of a client system 130. In particular embodiments, transactional system 160 may send instructions to application 135 running on client system 130 to display prompt 410 to the user of client system 130. In particular embodiments, transactional system 160 may send instructions to point-of-sale terminal 140 to display prompt 410 to the user. In the illustrated embodiment of FIG. 4, client system 130 is depicted as having no mobile-network service, so the location information of the user may not be determined and sent to transactional system 160. Accordingly, in particular embodiments, point-of-sale terminal 140 may send instructions (e.g., via BLUETOOTH) to application 135 running on client system 130 to display prompt 410 to the user of client system 130. Prompt 410 may be provided at the point-of-sale in place of prompt 310, which may only be displayed by application 135 when client system 130 has sufficient mobile-network service or internet connectivity.

Prompt 410 may provide any suitable information, including, as shown in the illustrated example of FIG. 4, an indication that a transaction has been opened and that the recommended payment attribute package has been set as the first attribute package. Prompt 410 may further include a request for a response by the user, and the requested response may be a "yes" or a "no," indicating whether application 135 should set a reminder to review the preselected payment attribute package (i.e., the recommended payment attribute package) at a later time during the predetermined window of time in which the transaction will be held pending by transactional system 160. As an example, if the user selects "yes" at prompt 410, application 135 may display to the user an interface for specifying a time for the reminder (e.g., in 20 minutes or at 2 pm) and the type of reminder to set (e.g., a silent or audible alarm or a push notification).

Although prompt 410 is described in a particular manner herein, prompt 410 may be represented in any suitable manner and generated using any suitable method or technique. It will be understood that although prompt 410 is depicted as providing certain information, this is for illustrative purposes, not by way of limitation, and that prompt 410 may provide any other suitable information related to the transaction including, as an example, a countdown of time until the predetermine period of time expires, information about the multiple attribute packages of the user (e.g., APR information, balances, payment due dates, rewards balances, and deep links to more detailed information about each attribute package), information regarding the recommendation (e.g., the first attribute package has the lowest APR), any other suitable information regarding the transaction, or any combination thereof. It will further be understood that prompt 410 is depicted as being a push notification appearing on a home screen of client system 130, this if for illustrative purposes, not by way of limitation, and prompt 410 may be any suitable notification presented in any suitable way at client system 130. As an example, prompt 410 may be presented on a lock screen, a home screen, hovering over an interface of a different application, or on an interface of application 135, and prompt 410 may be silent or accompanied by audible, tactile, or other suitable feedback. Prompt 410 may also be displayed at and interacted with via point-of-sale terminal 140.

Although this disclosure describes and illustrates particular embodiments of FIG. 4 as being implemented by client system 130, this disclosure contemplates any suitable embodiments of FIG. 4 as being implemented by any suitable platform or system. As an example, particular embodiments of FIG. 4 may be implemented by transactional system 160. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
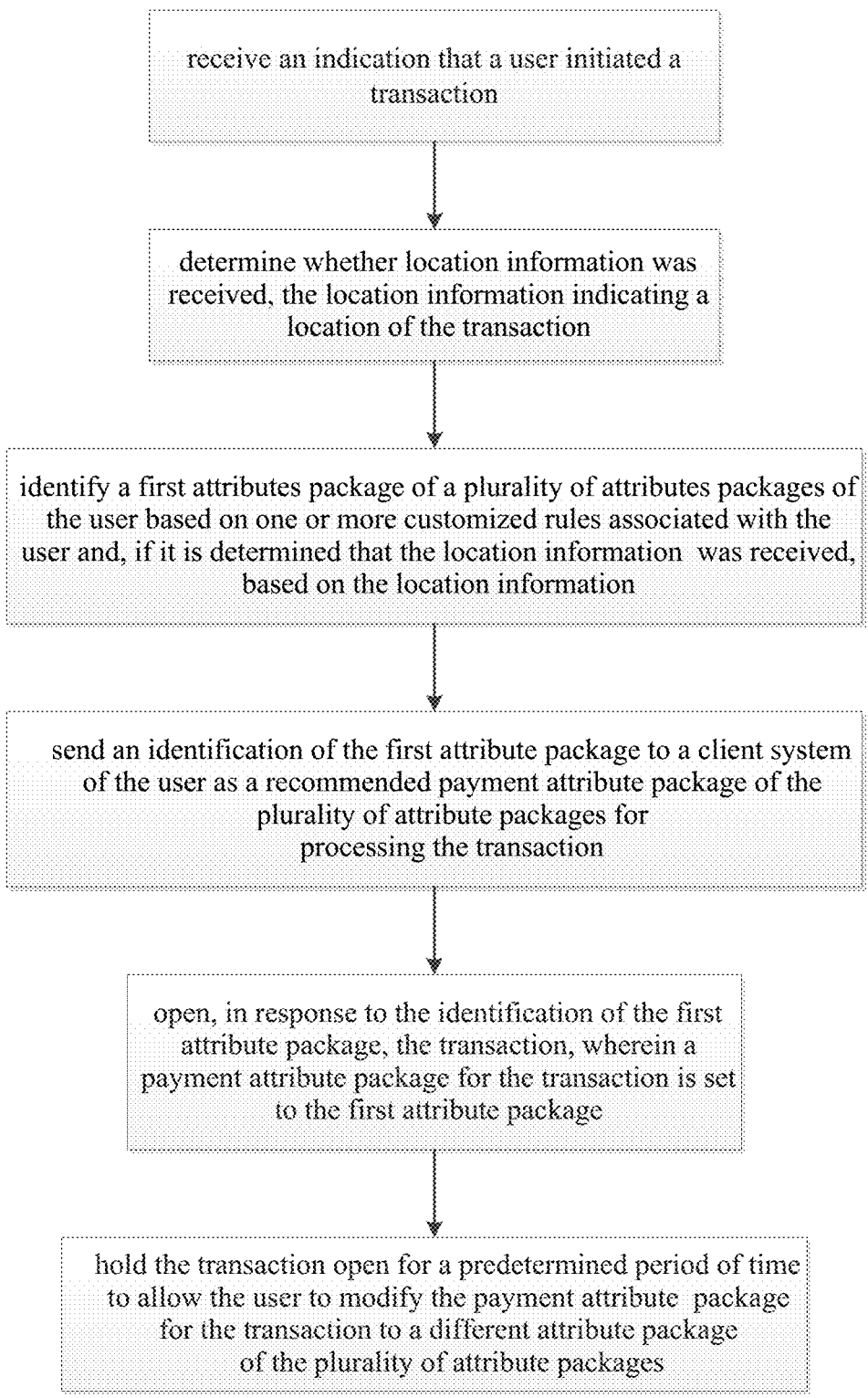
FIG. 5 is a flowchart illustrating an example method for opening a transaction in accordance with an embodiment of the present invention.

FIG. 5 is a flowchart illustrating an example method 500 for opening a transaction. The method may begin at step 510, where an indication that a user initiated a transaction is received. At step 520, it is determined whether location information was received, the location information indicating a location of the transaction. At step 530, a first attribute package of a plurality of attribute packages of the user is identified based on one or more customized rules associated with the user and, if it is determined that the location information was received, based location information. At step 540, an identification of the first attribute package is sent to a client system of the user as a recommended payment attribute package of the plurality of attribute packages for processing the transaction. At step 550, in response to the identification of the first attribute package, the transaction is opened, and a payment attribute package for the transaction is set to the first attribute package. At step 560, the transaction is held open for a predetermined period of time to allow the user to modify the payment attribute package for the transaction to a different attribute package of the plurality of attribute packages. Particular embodiments may repeat one or more steps of the method of FIG. 5, where appropriate.

Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for opening a transaction, including the particular steps of the method of FIG. 5, this disclosure contemplates any suitable method for opening a transaction, including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

In additional embodiments of the present invention, the disclosed system and method disclosed herein further have the capability to dynamically complete transactions with a merchant supporting a plurality of unique payment formats. Embodiments of the present invention dynamically identify the optimal transaction instrument and payment formats based on a wide range of factors, such as the merchant with which the user would like to transact business with, the financial instruments (e.g., payment card) that the users have access to, the use's location, user preferences and transaction history, fraud protection rules and preferences, available rewards, applicable interest rates, additional user requests in completing the transaction (e.g., money back), account balance, and others.

In particular embodiments, the user may initiate and complete a transaction using one or more payment formats supported by the merchant and the payment card. As an example, a user may use a mobile device and provide the merchant with a machine readable code (e.g., a two-dimensional bar code, a Quick Response code ("QR code")) generated by a user's mobile device. The merchant may scan the QR code using a QR reader or optical code scanner to receive the user's information required for processing a transaction. For instance, the user's information may include information identifying a payment card, the user, financial institution associated with the payment card, amongst other information. As another example of a payment format, a user device may come in range of and detect a beacon or point-of-sale system (e.g., via Bluetooth), and this may vacillate payment at the merchant location. The detection may cause the device to communicate payment information to the beacon or point-of-sale information using contactless near-field communication (NFC). As used herein, "payment format" refers any suitable method, product, hardware, software, or any combination thereof, by which a transaction may be completed (e.g., between a merchant and a user). Payment formats may use any combination of technology to complete a transaction. Examples of payment formats include payment methods that rely upon QR codes (or other forms of visual codes e.g., two or three dimensional codes), NFC, radio-frequency-based communications (RFC), BLUETOOTH communications, infrared-based payments, cloud-based mobile payment transactions, audio-signal-based payment transactions, messaging (e.g., SMS/MMS)-based transaction payment systems, direct mobile billing, mobile web payments (WAP), amongst others. Payment formats may also include method, product, hardware, or software that is used in combination on with one or more payment cards to complete a transaction. Other examples of payment formats within the scope of the present invention include the use of a mobile device's camera to scan barcode presented at a merchant location; biometric identification (e.g., retina, facial, fingerprint, etc.), in-app ordering, or manual entry of code (static or dynamically generated) to pair and link mobile devices to a merchant's point of sale.

In various embodiments, a user initiates a transaction for the purchase of a good or service by using a payment format, thereby providing his or her payment information. The user's mobile device may automatically select the optimal payment format based on a number of factors, as described herein. In addition, the optimal attribute package for the user may also be selected based on, amongst other factors (as described herein), the payment format selected for the user. A user's attribute package may have one or more accounts linked to multiple attribute packages, each of which may support one or more payment formats. Embodiments of the invention, thus, dynamically determine for the user which of the payment format and attribute packages—or which combination of the multiple attribute packages—would present the highest value to the user if applied to the transaction.

Particular embodiments provide methods and systems for processing a transaction initiated by a user at, for example, a point-of-sale terminal in a third-party store. The system may automatically provide the user with a payment format recommendation based on a wide array of factors. Each of these payment formats may be associated with one (or more) attribute packages. As described herein, each of the attribute packages may be associated with an account (e.g., credit card, bank card, and store card account) that may be used to complete the purchase with the merchant. A transactional system may determine the payment formats that are available to the user based on the merchant. The determination of the recommended payment format and payment attribute package may be based on location information of a transaction (e.g., information indicating that the user is at a particular store or geographic location), if received by the transactional system.

For instance, the transactional system may determine that the user is transacting at the particular retail store based on received location information. The transactional system determines the attribute packages that are available to the user for each of the different payment formats. For example, the transactional system may determine that a merchant supports a plurality of different payment formats, such as QR, bar code, NFC, and others. The transactional system may determine that a particular retail store credit-card attribute package may be the best attribute package for the user to apply to a transaction at the particular retail-store. Based on this determination, the transactional system provides the user with a recommendation to complete the purchase using an optimal payment format associated with the best attribute package for the user. Accordingly, the user is able to complete the purchase by paying for the producing the optimal payment format, resulting in the credit card provided by the attribute package being charged.

Figure 6:
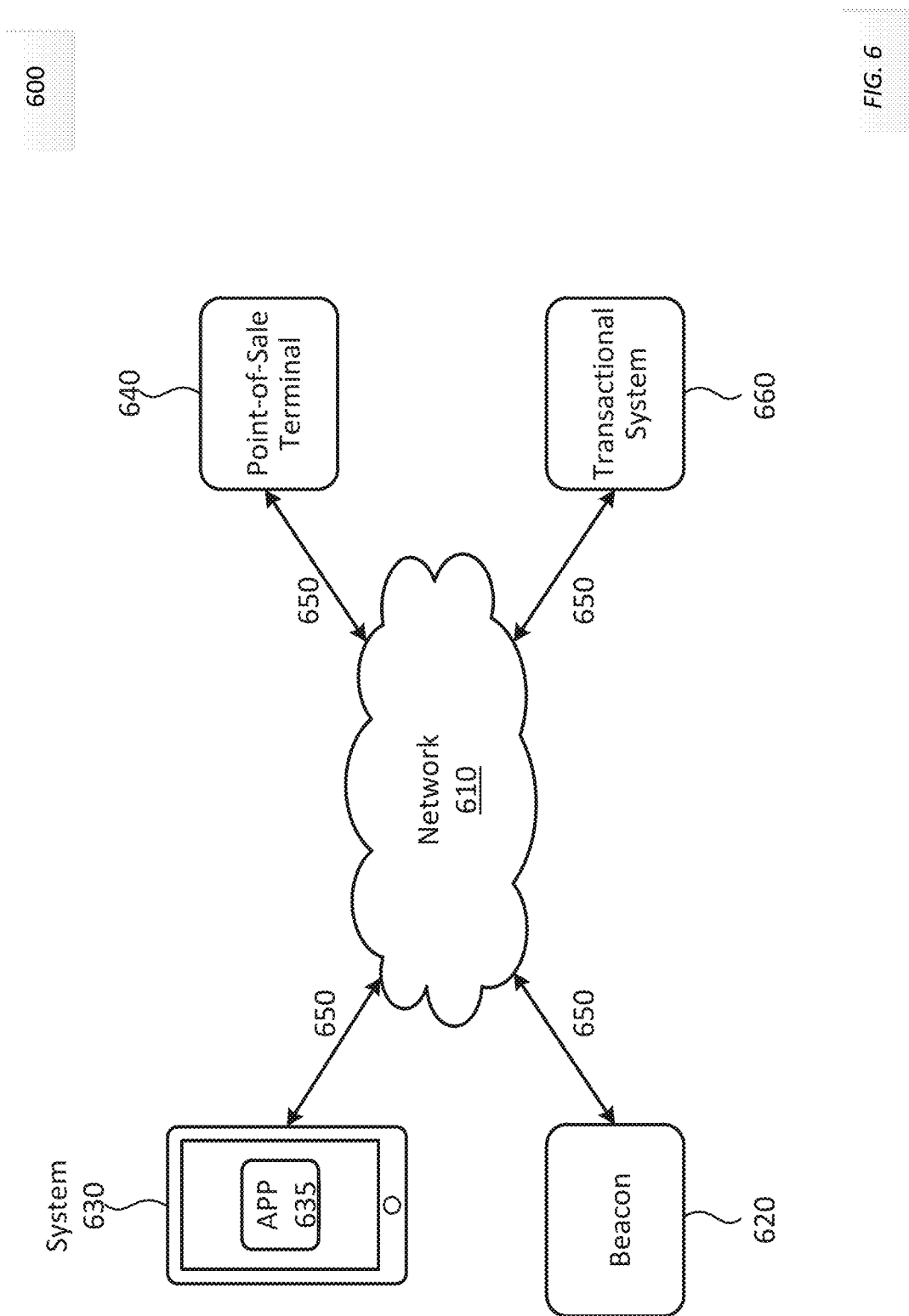
FIG. 6 illustrates an example network environment associated with a transactional system in accordance with an embodiment of the present invention.

FIG. 6 illustrates an example network environment 600 associated with a transactional system. Network environment 600 may include a beacon 620, a client system 630, a point-of-sale terminal 640, and a transactional system 660, connected to each other by a network 610. Although FIG. 6 illustrates a particular arrangement of beacon 620, client system 630, point-of-sale terminal 640, transactional system 660, and network 610, this disclosure contemplates any suitable arrangement of beacon 620, client system 630, point-of-sale terminal 640, transactional system 660, and network 610. As an example, two or more of beacon 620, client system 630, point-of-sale terminal 640, transactional system 660, may be connected to each other directly, bypassing network 610. As another example, two or more of beacon 620, client system 630, point-of-sale terminal 640, transactional system 660, may be physically or logically co-located with each other in whole or in part. Moreover, although FIG. 6 illustrates a particular number of beacons 620, client systems 630, point-of-sale terminals 640, transactional systems 660, and networks 610, this disclosure contemplates any suitable number of beacons 620, client systems 630, point-of-sale terminals 140, transact systems 660, and networks 610. As an example, network environment 600 may include multiple beacons 620, client systems 630, point-of-sale terminals 640, transactional systems 660, and networks 610. Additionally, although network environment 600 is illustrated and described as including particular components, this disclosure contemplates network environment 600 being implemented using any suitable combination of components.

Figure 7:
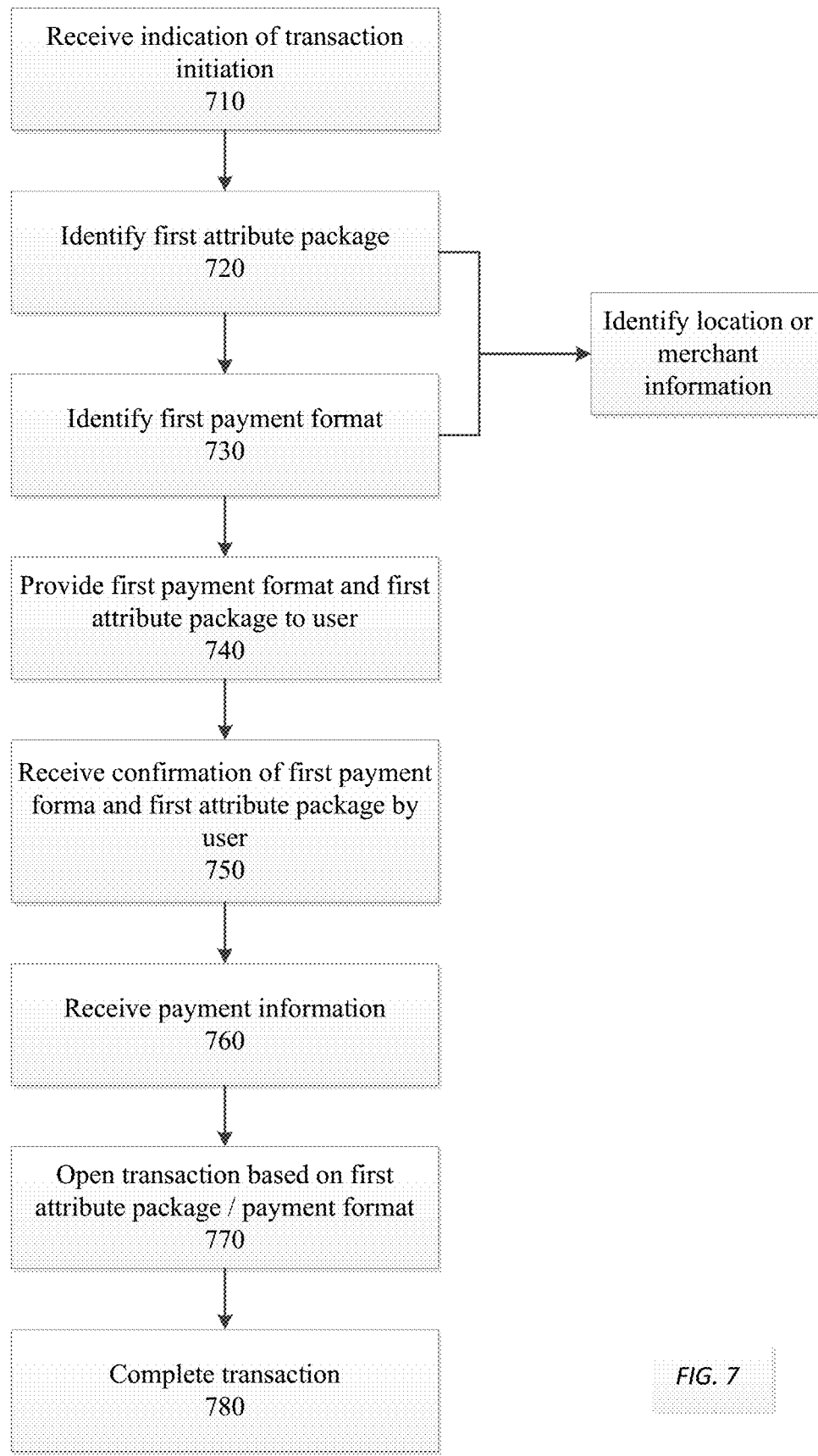
FIG. 7 is a flowchart illustrating an example method for processing a transaction in accordance with an embodiment of the present invention.

FIG. 7 is a flowchart 700 of illustrative steps for processing a transaction in accordance with an embodiment of the present invention. In particular embodiments, the steps of flowchart 700 may be implemented by one or more computing devices of transactional system 660. In particular embodiments, the steps of flowchart 700 may be implemented in order to process a transaction, which may correspond to, as an example, a transaction between a user and a third-party (e.g., a merchant).

At step 710, transactional system 660 receives an indication that a transaction was initiated. The indication may be sent from, as an example, one or more beacons 620, point-of-sale terminal 640, or application 635 running on client system 630. As one example, a user may select the application 635 finning on client system 630 indicating the user's desire to complete a transaction. Application 635 may be launched in response to user input received at client system 630. The application 635 may also be launched in response to the transaction being initiated by a user of client system 630 at point-of-sale terminal 640. In response, the application 635 may automatically determine the merchant with which the user would like to complete the transaction with. In one embodiment, this information is determined by the application 635 gathering the user's GPS location information, as determined by the client system 630.

As an example, the location information may indicate a geographic location of client system 630 (e.g., a global positioning system location), a type of third-party location (e.g., a restaurant chain), a particular one of a type of third-party location (e.g., the particular restaurant on Frankford Avenue), or any other suitable location information. In particular embodiments, the location information may be received from application 635 running on the client system 630, one or more audio-based devices proximate to the client system 630 (e.g., beacons 620), one or more short-range radio frequency devices proximate to the client system 630 (e.g., beacons 620), point-of-sale terminal 640, or any combination thereof. Location information may be sent to transactional system 660 at any suitable time. As an example, location information may be sent by one or more beacons 620 to transactional system 660 when the user's client system 630 is confirmed to be in range of the one or more beacons 620. In at least one embodiment, the application 635, running either in foreground or background of the client system 630, determines the user's location and/or the merchant when a user enters the premises of the merchant's brick-and-mortar store. As another example, location information may be sent by point-of-sale terminal 640 at the point-of-sale (e.g., when the user has initiated the transaction by providing payment credentials). Location information may also be sent to transactional system 660 when a user "checks in" at a particular place via an application running on client system 630 (e.g., a social media applications), taps a near-field communication device at a particular place (e.g., using client system 630), scans a Response (QR) code at a particular place (e.g., using client system 630), interacts with or comes within a particular range of a kiosk at a particular place, when the user's mobile devices receives audio-based, visual-based or radio-frequency-based communication from a beacon or point-of-sale terminal, or other or any other suitable technique for determining location information of the user. Whether or not the location information is received by transactional system 660 may depend, as an example, on whether client system 630 has sufficient mobile-network service, sufficient wired or wireless internet connectivity, or both; on whether client system 630 is in range of and able to wirelessly communicate with any other suitable devices proximate to client system 630 (e.g., one or more beacons 620 and/or point-of-sale terminal 640); and on whether the location and/or BLUETOOTH capabilities of client system 630 are turned on. In particular embodiments, a user may be initiating a transaction with a merchant online, and no location information may be received at transactional system 660. When no location information is received at transactional system 660, information regarding the transaction may be sent to transactional system 660 at the point-of-sale (e.g., by point-of-sale terminal 640 or other suitable third-party system).

In at least one embodiment, application 635 may receive merchant information from the point-of-sale terminal 640 or beacon 620. In another embodiment, the client device 630 may intermittently determine the user's location and retrieve a listing of nearby merchants supported by the transactional system 660. The application 635 may also use this information to provide the user with notices of merchants supported by the transactional system 660.

In yet another embodiment, the merchant information is provided through the use of audio. For instance, the application 635 operating on the client device 630 may automatically determine the merchant by receiving, detecting and processing encoded audio near or at the merchant's brick and mortar store. Thus, the client device 630 may automatically detect merchant information encoded in audio, which may be audible or inaudible (e.g., a high-frequency audio). In other embodiments, the user may manually select the merchant from a list of merchants that the transactional system 660 supports.

In response to the received indication that the user has initiated a transaction, at step 720, transactional system 660 identifies a first attribute package of a plurality of attribute packages. In particular embodiments, the first attribute package may be the optimal attribute package for the transaction based on the value to the user as determined by transactional system 660, as described in various examples herein. In addition, the identified first attribute package of a plurality of the attribute packages selected may also be dependent payment format information. For instance, the attribute package selected for the user may dependent on the user's customized rules on payment format (e.g., preference to use QR payment method instead of low-energy radio frequency), history of payment format use (e.g., user uses QR payment method 90 percent of the time or most recently), payment format available or preferred by the merchant, rewards for use of particular formats, transaction costs for merchant, the user or third parties, and others. It should be recognized that the attribute package identified may be also based on historical information, such as the user's selection history for particular payment formats, either generally, or for particular merchants, time, location, and so on. The attribute package may be selected based on one or more rules.

In response to the received indication that the user has initiated a transaction of step 710 and/or the determination of one or more first attribute packages of step 720, at step 730, the transactional system 660 identifies a first payment format of a plurality of payment formats. In various other embodiments, the transactional system 660 identifies the first payment format from a plurality of payment formats supported by the user prior to the selection of the first attribute package. In some embodiments, the selection of the first attribute package may be dependent on the payment format selected for the user.

In various embodiments, after having received notification of a transaction at step 720, the transactional system 660 may receive location or merchant information from the client system 630. Based on the location information, the transactional system 660 determines the payment format(s) supported by the merchant. In one embodiment, the transactional system 660 determines the plurality of payment format(s) supported by the merchant soon after the user enters the merchant's brick and mortar location. Based on the location or merchant information, the client system 660 accesses a merchant database accessible to the transactional system 660, which provides information regarding merchants, including the payment formats supported by the merchant. The optimal payment format selected for the user may also be selected based on the type or category of the merchant and/or the merchant type/category's checkout methods. For instance, payment format may be selected based on whether the merchant is a retail store with checkout lines, a restaurant that provides table service dining, a fuel station with pay-at-pump capabilities, transportation stations and stops, entertainment stadiums or areas, drive through dining, and others.

The transactional system, at step 730, selects an optimal payment format for the transaction based on the value to the user as determined by transactional system 660. Value to the user may be based on the attribute package selected at step 720. In addition, value to the user may also be based on provision to the user of information regarding the transaction, including, for example, purchase information, a merchant category, a purchase category, and any other suitable information regarding the transaction, rewards value for the transaction, annual percentage rate (APR), transaction fees, transactional rewards, non-transactional bonus rewards, predicted impact on credit score, credit line availability, insurance, price-purchase protection, merchant specific benefits, any other suitable benefit value, or any combination thereof.

The transactional system 660 may select an optimal payment format based on the user's history of payment format selection. Thus, the payment format identified may be based on different historical information, which may include the user's selected payment formats for a historical period, and may include the merchant involved, the type of products being purchased and other information. For example, the transactional system 660 may select a QR-code based payment format for a user because he has chosen this payment format 90 percent of the time in the last 6 months. The transactional system 660 may select a radio-frequency-based transaction format for another user because she selected this payment format the last time she transacted with the same merchant for low-value transactions or where the merchant is in the self-checkout aisle of the store. Where the transaction being completed is high-value, the transactional system 660 may select a different payment format (and different attribute package) for that user.

The optimal payment format selected may also be dependent on the availability of network connectivity at the time of payment. As some payment formats may require internet connectivity at the time of the payment, such payment formats may not be selected if the Internet connection is weak or likely to disconnect. The determination of whether the Internet connection is available may be determined by the phone's Internet connectivity capabilities, by location, by information received from a beacon or point-of-sale, or by other means.

In addition, the optimal payment format selected for the user may be dependent on user's customized rules on payment formats. Customizable rules may include, as an example, rules based on user attributes (e.g., user preferences), attributes of each payment format, attributes of the third party with whom the user is transacting, transaction-specific attributes (e.g., attributes of a product to be purchased, including, for example, price comparison information), availability of benefits (e.g., coupons, offers, tipping, rewards membership), any other suitable factor for determining which of the user's payment format would bring the most value to the user for the particular transaction, or any combination thereof. For example, transactional system 660 may use a customized rule based on a comparison of the price of a product at a store at which the user is currently located to the price of the product at a different store (e.g., at another brick-and-mortar store or at an online retailer) to provide a recommendation to the user to purchase the product at the different store using a particular payment as the purchase at a different store would be more valuable to the user (e.g., the different store is offering a price discount for the product if purchased using a particular attribute package). Customized rules may include, as an example, greatest rewards value for the transaction, lowest APR, rules associated with any other value, convenience or attribute associated with a payment format, or any combination thereof. Any suitable combination of customized rules may be used to identify a first payment format for recommendation to the user. For example, the customized rules used may include one or more rules set by transactional system 660 and one or more rules based on user preferences (e.g., user preference may indicate that a particular payment format should always be used at a particular place). In another example, a user may set rules based on his preferences as the default rules to be applied in identifying a first payment format. Transactional system 660 may rank the customized rules using any suitable technique, as described herein. For instance, transactional system 660 may then determine which of the customized rules to apply based on rankings or weights. Transactional system 660 may identify the first optimal payment format using any suitable technique.

In response to the identification of the first attribute package in step 720 and the identification of the first payment format in step 730, at step 740, transactional system 660 may transmit an instruction to the application 635 at client system 630 to provide the user with the recommendation. For instance, transactional system 660 may send instructions to application 635 running on client system 630 to provide a prompt for display to the user. The prompt may include the identification of the first attribute package as the recommended payment attribute package for processing the transaction. The recommendation may further provide the first payment format as the recommended payment format for processing the transaction.

Figure 8:
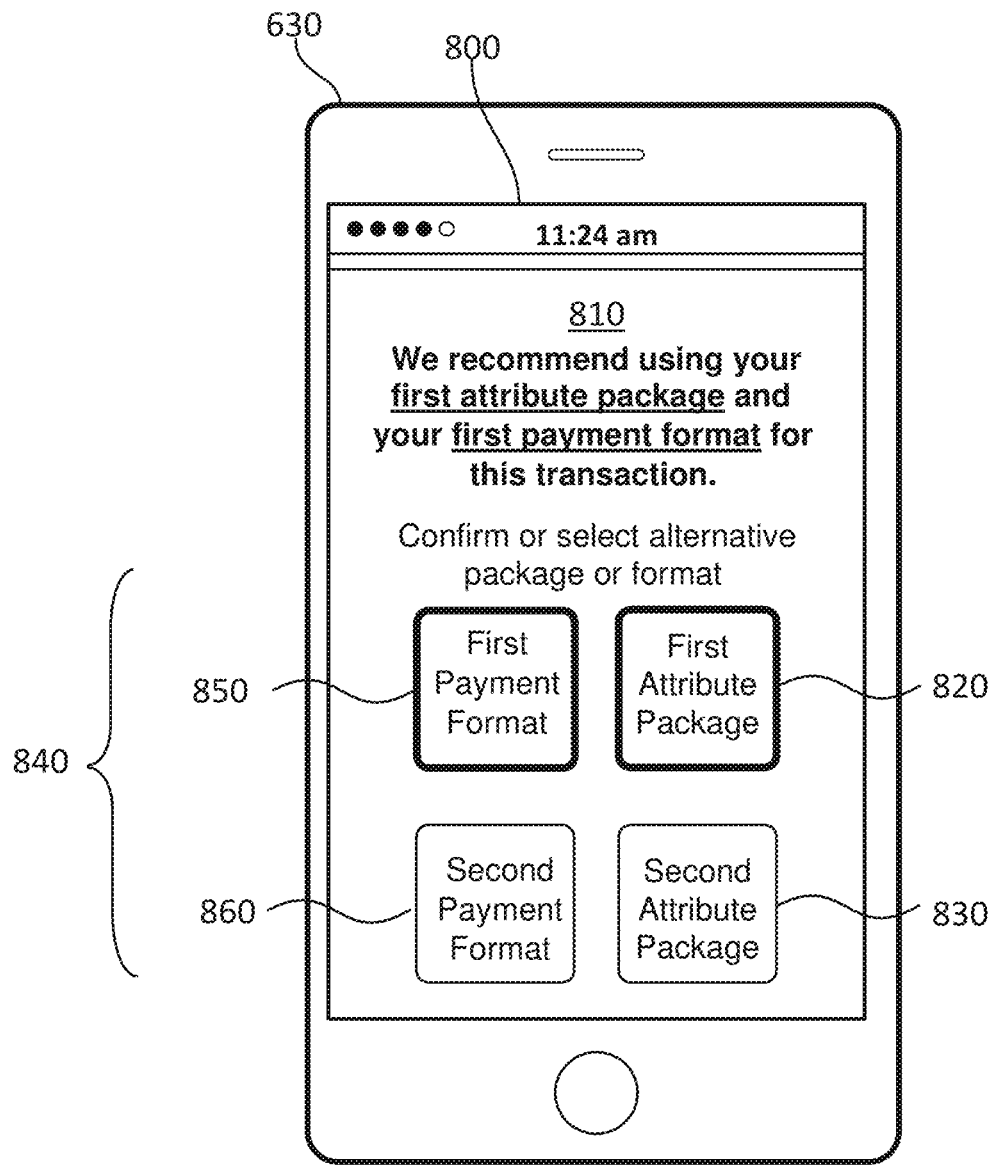
FIG. 8 illustrates an example prompt provided at an interface of a client system in accordance with an embodiment of the present invention.

FIG. 8 provides an exemplary prompt that may be displayed at an interface of client system 630 or at an interface of point-of-sale terminal 640. In particular embodiments, transactional system 660 may send instructions to application 635 running on client system 630 to display prompt 810 to the user of client system 630. In particular embodiments, transactional system 660 may send instructions to point-of-sale terminal 640 to display prompt 810 to the user. Prompt 810 may be provided at, before, or after the point-of-sale.

Prompt 810 may include, as shown in FIG. 8, a recommended attribute package—first attribute package 820—which may be selected by transactional system 660 out of multiple attribute packages 830 of the user as the payment attribute package for a particular user-initiated transaction. Prompt 810 may further include, as shown in FIG. 8, a recommended payment format—first payment format 850—which may be selected by transactional system 660 out of multiple payment formats 860 of the user as the payment format for a particular user-initiated transaction. Prompt 810 may additionally include instructions to the use to confirm first attribute package 820 as the payment attribute package and the first payment format 850 as the first payment format, or else, select a different attribute package or payment format. The user may select, via interface 800 of client system 630, second attribute package 830 or second payment format 860 for processing the transaction.

As an example, transactional system 660 may preselect first attribute package 820, which may be a credit-card account for a merchant, based at least in part on the user's pre-determined merchant rules. Based on the merchant and attribute package selected, the transactional system 660 may further select a first payment format 850, which may be the use of QR bar code, based at least in part on the merchant that is involved in the transaction and the availability for additional rewards (e.g., a restaurant that provides double points), if the QR-based payment format is chosen.

The user may determine, however, that he would rather apply a different payment format—second payment format 860—which may be a radio-frequency based payment format. The client system may initiate the process for completing the transaction using the second payment format 860. Transactional system 660 will then initiate the process for completing the transaction using the second payment format 860, even though the value to the user may have been greater if the first payment format 850 had been used to complete the transaction. As described herein, transactional system 660 may employ any suitable machine-learning algorithms or heuristics to determine the recommended payment attribute package (i.e., first attribute package 320) and the payment format based on past user behavior. Thus, the next time the user is transacting at the particular retail-store location, transactional system 660 may determine a different recommended payment attribute package and payment format based on past user behavior. In particular embodiments, transactional system 660 may modify its recommended payment attribute package and payment format in response to the user, as an example, selecting an alternative choice.

Although prompt 810 is described in a particular manner herein, prompt 810 may be represented in any suitable manner and generated using any suitable method or technique. In particular embodiments, as an example, when the location information is received (i.e., client system 630 has service or internet connectivity), the prompt may include a real-time request to confirm the identified first attribute package and first payment format or to select a different attribute package or payment format with which to process the transaction.

At 750, the user confirms the first payment format 850 and first attribute package 820. In one embodiment, the user's confirmation is confirmed automatically for the user after a pre-determined amount of time.

At 760, the point-of-system may receive the payment information using the first payment format 850. For instance, the client system 630, after having received confirmation at 750, may automatically proceed to complete the transaction using the first payment format. In this example, the client system 630 automatically generates the QR code for display on the client system 630 display. The user may present this generated QR code to the merchant employee and this code may be scanned using a QR code reader. The transactional system 660 may receive the payment information based on the QR code detected at the merchant. In certain embodiments, such as where the payment format is audio, radio frequency, or other wireless-based payment format, the payment information may be communicated automatically from the client device 630 and received by the beacon or point-of-system without user participation.

At step 760, transactional system 660 may open the transaction. The transaction may be pending until closed. After the transaction has been opened, transactional system 660 may hold the transaction open (i.e., pending) for a predetermined period of time to allow the user to modify the payment attribute package or payment format as described herein. In particular embodiments, the user may modify the set payment attribute package and/or payment format using application 635 running on client system 630 (e.g., by interacting with a push notification generated by application 635), via a webpage associated with transactional system 660, which may be accessed by client system 630, or by sending an email to transactional system 660 (e.g., via client system 630). In particular embodiments, the user may modify the set payment attribute package or payment format for the transaction via a webpage associated with transactional system 660, application 635 running on client system 630, point-of-sale terminal 640, one or more beacons 620, any other suitable method of communicating with transactional system 660, or any combination thereof. At the end of the predetermined period of time, transactional system 660 may determine whether the user made a selection of a second attribute package or payment format for the transaction during the predetermined period of time. In particular embodiments, transactional system 660 may receive an indication that the user selected a second attribute package or payment format—or confirmed the first attribute package and payment format—at any time during the predetermined period of time.

At 780, the transactional system 660 may close the transaction, processing the transaction with the selected attribute package using the selected payment format.

Embodiments of the present invention further assist users to optimally and efficiently complete transactions through automated applications and processing of payment features. Embodiments of the present invention further support payment features provided by financial institutions, merchants and third parties, such as cash-back, loyalty points, gift card integration, coupons, deals, offers, transaction receipt, warranty, price match (competitor prices), price protection (if price drops), recall notifications, and re-orders.

Figure 9:
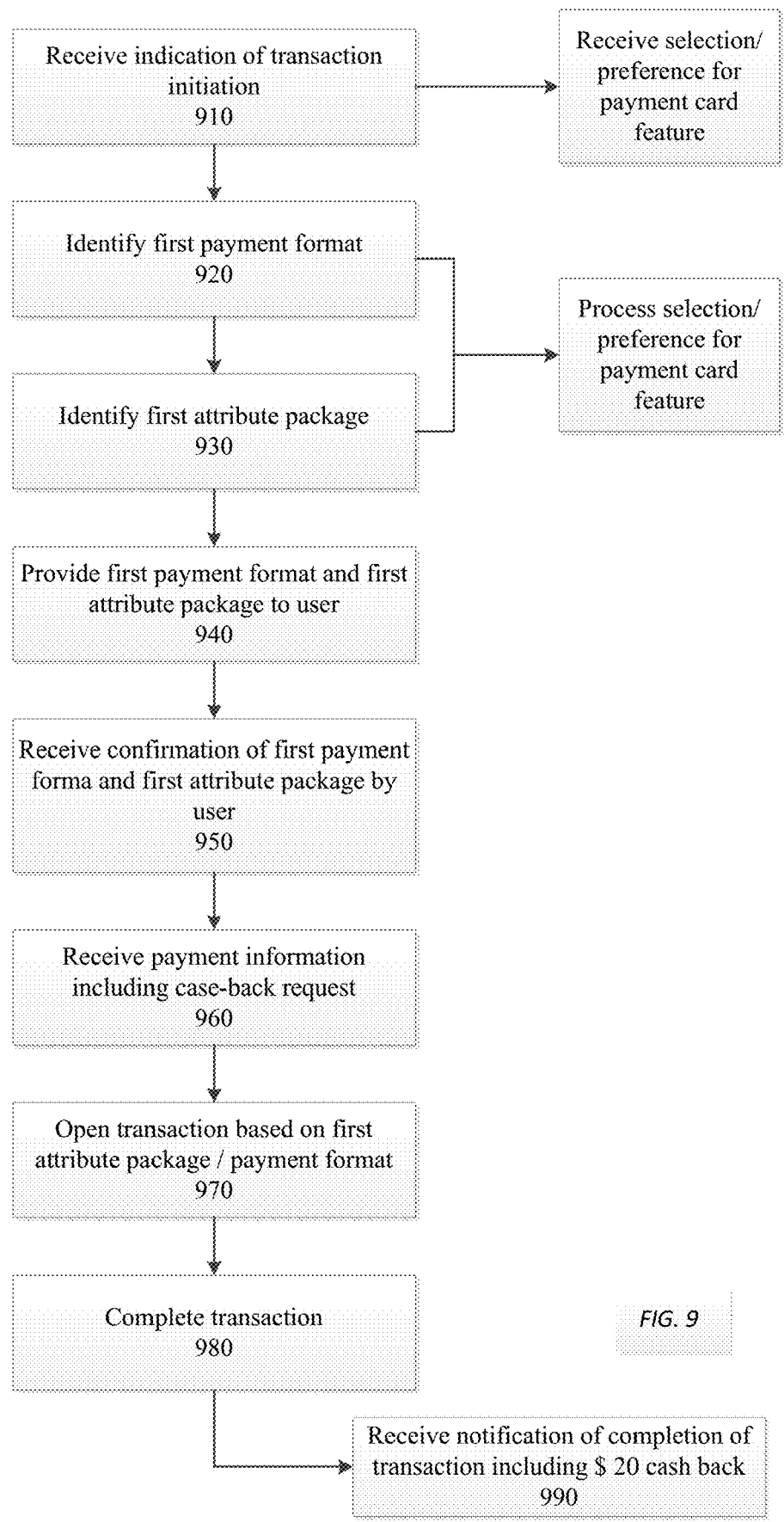
FIG. 9 is a flowchart illustrating another example method for processing a transaction in accordance with an embodiment of the present invention.

FIG. 9 is a flowchart illustrating an example method 900 for opening a transaction involving one or more payment features. The method may begin at step 910, where an indication that a transaction has been initiated. The notification of the initiation of the transaction may include receiving, at 915, a selection or preference for a payment feature. For instance, the transaction indication further includes a user desire for 20 dollars cash back in completing the transaction.

At 920 and 930, a first attribute package and a payment format are selected. In particular, the first attribute package and format is identified based at least in part on one or more payment features. Based in part on the cash-back feature, a first attribute package associated with the user's debit-card is chosen, and QR code transaction is chosen because the user's debit card supports the QR code transaction and because the user has shown a preference for the QR code transaction format. The selection of the first attribute package and the payment format may also be dependent on other information and customized rules, as described herein. For instance, the QR-based payment format may be selected over other payment formats because the financial institution or the merchant may be charged a lower transaction processing fee. As another example, the selected first attribute package may be selected over others because the debit card account associated with the first attribute package provides users with a reward for using the card-back feature with that merchant. This and other rewards incentivize merchants, financial institutions and other parties to create rewards and promotions.

At step 940, an identification of the first attribute package and first payment format is sent to a client system of the user as a recommended payment attribute package and payment format for processing the transaction. At step 970, in response to confirmation of the first attribute package (at 950) and the completion of the first payment format transaction process (at 960), the transaction is opened. As part of the processing, the cash-back feature is automatically processed. The user's debit account may be charged the total amount of the purchase, along with the additional $20 requested in the cash-back request and the transaction may be closed at 980.

At 990, the point-of-sale system is notified of the completion of the transaction and is provided with notification to provide the user with $20 in cash back. Thus, embodiments of the present invention allow for the user to take advantage of various payment features with little to no user intervention. This example is provided with reference to a selection for cash back, but it should be recognized that other payment features may be supported.

As one example, tips can be incorporated into the transaction processing method described in FIG. 9. In such examples, at step 910, notification of a transaction may be received. The transaction notification may include an instruction to include a customizable tip amount to be added to the total. At step 920, the first attribute package may be selected based on the restaurant and tip amount. For example, a credit card with double-points for restaurant transactions may be selected automatically. Furthermore, a radio-frequency based payment format may be selected because the restaurant only supports this format. At step 940, the user confirms the first attribute package and the first payment format. As described herein, the user's confirmation of the first attribute package and the first payment format may cause the client device to proceed to the next step necessary to complete the payment process. For instance, where the payment format is the use of a QR code, the client device 630 generates a QR code. The QR code generated may include the user's desire to include a tip and the amount of the tip. In response, the transactional system 660 opens the transaction. As part of the processing, the transactional system 660 automatically adds a tip of 20 percent to the total. In certain embodiments, the tip amount may be dynamically calculated based on the amount, history of transactions (e.g., tip) at the restaurant, and other factors. In this example, information regarding tips, including options relating to whether or not to provide a tip, the tip amount, and other factors, may be managed by the client device and/or the transactional system and be different for each merchant and user.

As seen, embodiments of the present invention may facilitate the use of one or more payment features by providing an instruction of the user's desire to use the payment feature during various stages of a transaction, including at the initial notification of a transaction, at the opening of the transaction using the payment format (e.g., the generation of the QR code), or even after the opening of the transaction by the transactional system 660. Embodiments of the present invention, thus allows users to receive the benefits of such features automatically and with little intervention on the part of the user.

In another example, the transactional system 660 supports loyalty programs. For instance, after the notification of a new transaction, the transactional system 660 may determine whether the user belongs to a loyalty program associated with the merchant. This information may be retrieved by the transactional system 660 or be passed from the client device 630. In one embodiment, transactional system 660 or the point of sale 640 utilizes the user's name (as provided by the client device 630) to determine whether the user belongs to a loyalty program. Upon determining that the user does belong to the merchant's loyalty program, the user's loyalty program account formation may be automatically retrieved by the transactional system and/or the merchant. The user's loyalty program account information may be stored at the transactional system 660 and/or client device 660 and passed to the merchant. Discounts may be automatically applied in accordance with the merchant's policy. In one embodiment, the transactional system 660 or client device 630 may store the user's loyalty program account information automatically and use this information subsequent transactions.

Similarly, in some embodiments, the transactional system 660 supports the use of coupons as a payment feature. Coupons may be integrated into the transaction processing sequence without requiring user intervention. For instance, when notification of transaction is received, the notification may further include an instruction instructing the transactional system 660 that the user would like to apply one or more coupons. In another embodiment, the point-of-sale or beacon may provide the client device 630 and transactional system 660 with information describing the products that the user is purchasing and the client device 630 or transactional system 660 may automatically retrieve information regarding any coupons that could be applied to the user's purchase. In at least one embodiment, such information is stored at a database of the transactional system 660. The application 635, in at least one embodiment, has the capability to retrieve and manage payment feature information that may benefit the user in completing a transaction and may automatically retrieve and store coupons that may be of-interest to the user.

In at least one embodiment, the transactional system 660 retrieves the information from a server associated with the merchant or a third party system. Indeed, embodiments of the transactional system have the capability to automatically search and retrieve various information that could benefit the user or could be used in determining the optimal first attribute package or first payment format. Upon retrieval, the transactional system 660 may store this information for subsequent use with the users. For example, the system may automatically retrieve information regarding coupons, loyalty program information, gift card balance information, news, and other information and automatically associate information that may be used in subsequent transactions. The retrieval may be performed in response to the notification of a transaction, or may be performed at predetermined intervals.

Figure 10:
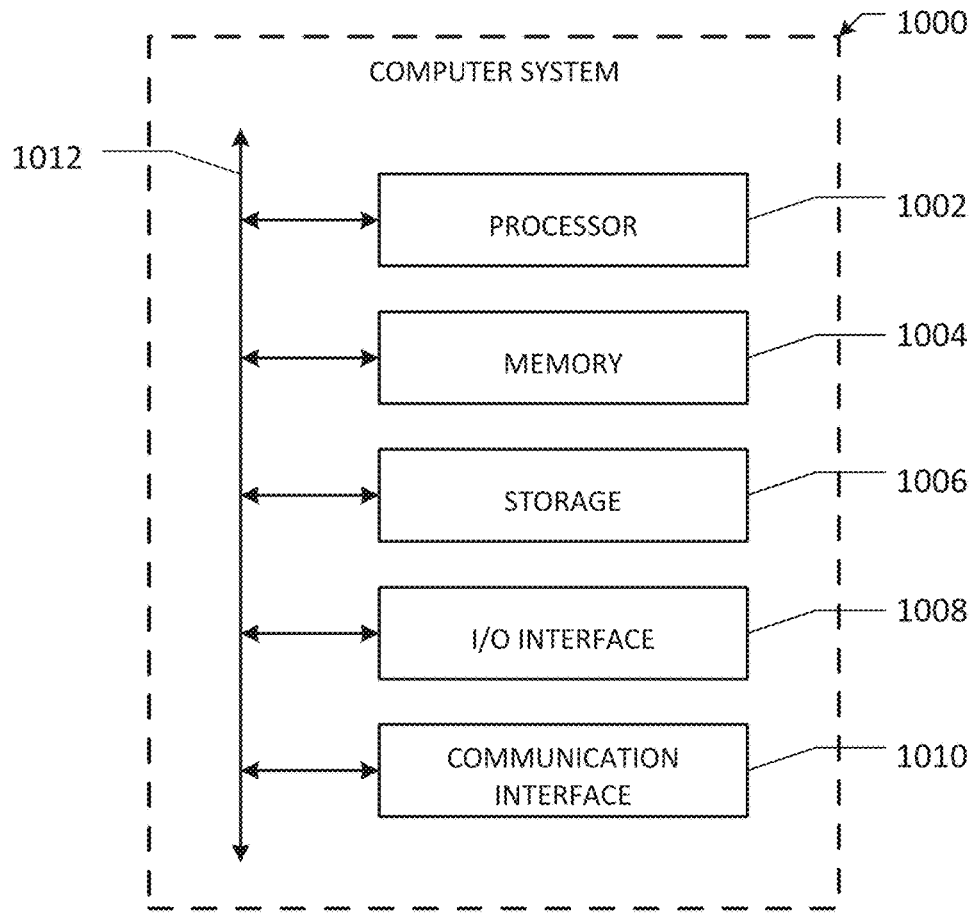
FIG. 10 illustrates an example computer system in accordance with an embodiment of the present invention.

FIG. 10 illustrates an example computer system 1000. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more compute systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As an example, computer system 1000 may be an embedded computer system, a system-on-chip (SOC), a singleboard computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one more methods described or illustrated herein. As an example, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this discloser contemplates any suitable computer system having any suitable number of any suitable components in any suitable arrangement.

In particular embodiments, processor 1002 includes hardware for executing instructions, such as those making up a computer program. As an example instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or nonremovable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM ay be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example, communication interface 1010 may include a network interface controller (NIC) or network adapter for communicating with an Ethernet or other wirebased network or a wireless NIC (WNIC) or wireless adapter for communicating with a wireless network, such as a WI-FI network. This disclosure contemplates any suitable network and any suitable communication interface 1010 for it. As an example, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field programmable gate arrays (FPGAs) or application-specific ICs (ASICs)), hard disk drives (HDDs), hybrid hard drives (HHDs), optical discs, optical disc drives (ODDS), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, volatile, or a combination of volatile and non-volatile, where appropriate.

In at least one embodiment of the computer system 1000, the components of computer system 1000 provides the functionality of the transactional system described herein.

Figure 11:
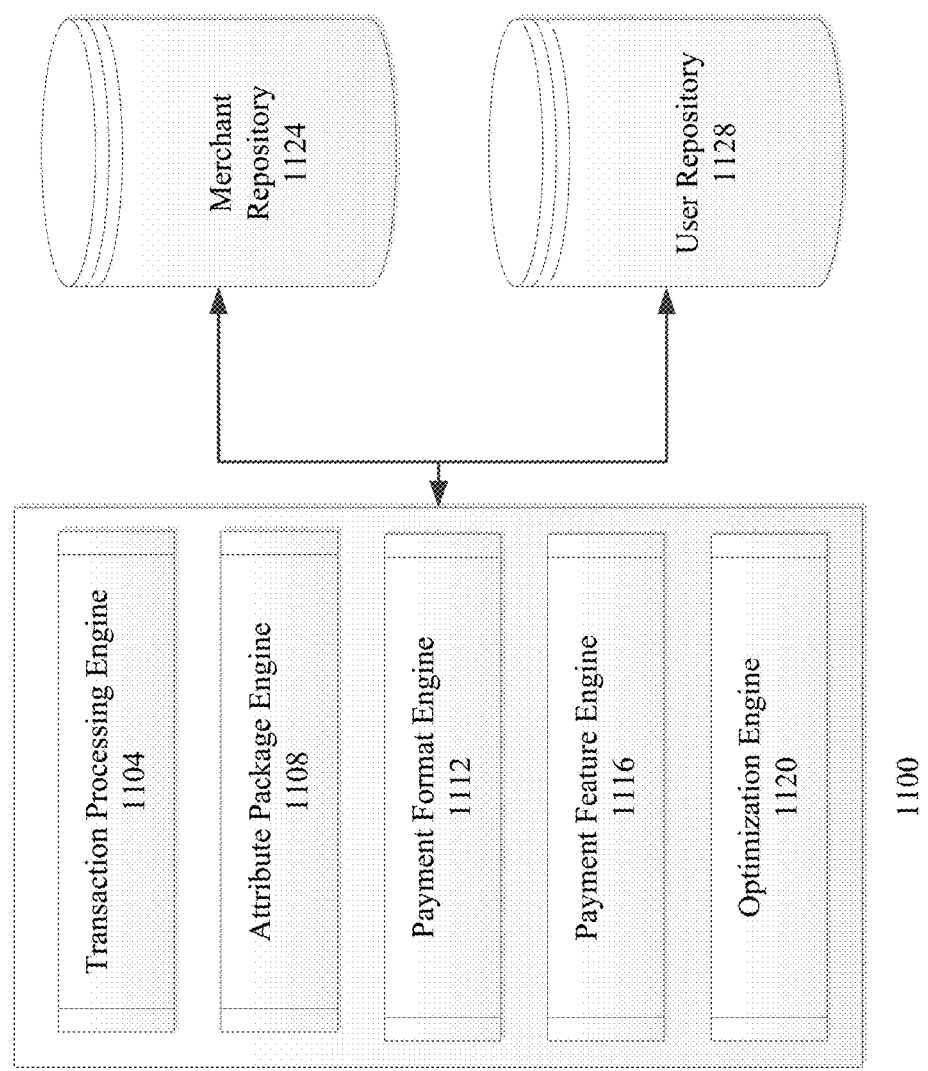
FIG. 11 illustrates a transactional system in accordance with an embodiment of the present invention.

FIG. 11 illustrates the transactional system 1100 that includes at least some or all of the components show in FIG. 10. As seen in FIG. 11, the computer system comprises a plurality of engines and databases. The at least one processor of the transactional system 1100 executes computer instructions stored in non-transitory memory to execute one or more functionalities of the engines illustrated in FIG. 11. The transactional system 1100, as illustrated in FIG. 11, includes a transaction processing engine 1104, an attribute package engine 1108, a payment format engine 1112, a payment feature engine 1116, and an optimizer engine 1120. As seen in FIG. 11, the transactional system further comprises or has access to at least one database. The database may be stored in non-transitory memory. The transactional system 1110 may have access to a merchant repository 1124 and a user repository 1128. While each of the engines described herein are provided as providing different functionality, this is provided as examples only and does not limit the present scope of the present invention. The functionality described in this example and as described above may be provided by any one (or more) engines and databases.

The transaction processing engine 1104 receives notification of one or more transactions with a client device, as described herein. Furthermore, the transaction processing engine 1104 manages the processing of a transaction. The transaction processing engine may operate in conjunction with the attribute package engine 1108, payment format engine 1112, payment feature engine 1116, and optimizer engine 1120 to complete a transaction. The transaction processing engine 1104 may further communicate with one or more servers associated with merchants and third parties, such as financial institutions, to complete a transaction. The attribute package engine 1108 and payment format engine 1112 analyze the attributes of the user and transaction to identify the optimal attribute package and payment format for each transaction, as described herein. The attribute package engine 1108 and payment format engine 1112 may identify the optimal attribute package and payment format for each transaction using information stored at the merchant and user repositories 1124 and 1128. In at least one embodiment, the attribute package engine 1108 and payment format engine 1112 operate according to one or more selected code modules stored at a code repository, each of which provides a unique algorithm for optimally identifying an attribute package or payment format. The attribute package engine 1108 and payment format engine 1112 may dynamically select one or more of these code modules for execution by at least one processor of the transactional system 1100 based on the merchant, user, transaction, or other factors.

The payment feature engine 1116 facilitates the use of various payment features, as described herein. For instance, the payment feature engine 1116 may assist in identifying and processing a user's request for tipping, loyalty programs, coupons, gift cards, cash-back, donations and other features. In one embodiment, the payment feature engine 1116 communicates with merchants and third party systems to identify and retrieve information related to payment features. For instance, the payment feature engine 1116 automatically communicates with a merchant system to determine whether a user belongs to a loyalty program. The payment feature engine 1116 may transmit a request to the merchant system that includes the user's name or other identifying information. The merchant system, in response, may search its loyalty program database for the user's participation and provide the payment feature engine 1116 with a response of the user's loyalty program identifier which may be used by the client device to identify the user's participation in the loyalty program to a point-of-sale system. In at least one embodiment, the payment feature engine 1116 updates the merchant and/or user repository with the information. Thus, the payment feature engine 1116 may update the user's account information to include the loyalty program identification. In at least one embodiment, the payment feature engine 1116 may communicate the loyalty program identification to the client device for storage and use thereat.

Embodiments of the payment feature engine 1116 may automatically collect information from merchants and third party systems without a user request (e.g., continuously, at intermittent periods, etc.) for information that may be useful or to encourage the user to use one or more payment features. As one example, using payment history information for a user, the payment feature engine 1116 may automatically search and retrieve coupons (e.g., weekly grocery coupons), loyalty program availability, or even gift cards (e.g., gift cards received electronically in a user's merchant account or personal email) that the user may utilize. Thus, the payment feature engine 1116 may retrieve deals and other cost-saving features that the user may be interested in based on the user's transaction history or rules. The payment feature engine 1116 may automatically update the merchant and user repositories accordingly.

In at least one embodiment of the present invention, the transactional system 1100 includes the optimization engine 1120, which optimizes the identification of an attribute package or payment format described herein. The optimization engine 1120, for instance, may modify the algorithms used to select an attribute package or payment format based on feedback received. For instance, the optimization engine 1120 may automatically detect that 90 percent of users are rejecting the recommended radio-frequency-based payment format at merchant A. As a result the optimization engine may modify the functionality of the payment format engine 1112 to select the use of a QR code when merchant A is involved. Similarly, if the optimization engine 1120 detects that user B frequently prefers to use his debit card rather than his credit card, the optimization engine 1120 may modify the functionality of the attribute package engine 1108 for this particular user accordingly. In one embodiment, the optimization engine generates code modules for execution by the attribute package engine 1108 or payment format engine 1112 in selecting the optimal attribute package or payment format.

The merchant repository 1124 stores merchant information used by the engines of the transactional system 1110. The merchant repository 1124 may include, for example: information describing information of each of the merchant's stores, including the stores' geolocation; supported transaction cards; supported payment formats; merchant payment preferences; merchant rules; loyalty program(s); coupons, tip support; other payment feature information. The user repository 1128 similarly includes user information used by the engines of the transactional system 1110 and may include, for example, the user's attribute package(s), transaction card(s); rules, loyalty account, cash-back preferences, merchant-specific rules, tipping preferences, transaction history, and location history. The merchant repository 1124 and user repository may include other information, including other information described and used to provide one or more functionalities described herein. The optimization engine 1120, in one embodiment, collects information stored at the merchant repository 1124 and user repository 1128 from merchants, financial institutions and other third party systems and databases.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method for processing a transaction involving a merchant and a user using a system, the method comprising:
   receiving, by a transaction management computing device, over at least one communication channel, an indication of a user transaction;
   determining, by the transaction management computing device, location information indicating a location of the user transaction or merchant information indicating a merchant involved in the user transaction;
   identifying, by the transaction management computing device, a first attribute package and a second attribute package different from the first attribute package of a plurality of attribute packages and a first payment format and a second payment format different from the first payment format of a plurality of payment formats, based on at least one or more customized rules associated with the user and the determined location information or the determined merchant information;
   automatically displaying on an interface of a client device, in response to the identifying, a selectable first icon that represents the first attribute package, a selectable second icon that represents the second attribute package, a selectable third icon that represents the first payment format, and a selectable fourth icon that represents the second payment format;
   communicating, by the transaction management computing device, an instruction to the client device to identify the selected first attribute package and the first payment format as a recommendation to the user;
   initiating, by the transaction management computing device, the user transaction upon receiving a confirmation indicating selection of the identified first payment format and the identified first attribute package; and
   holding, by the transaction management computing device, the user transaction open for a predetermined period of time to allow the user to modify the selected first payment format to the second payment format or the selected first attribute package to the second attribute package for the user transaction,
   wherein the first and second attribute packages are connected with a selected payment card of the user based on the one or more customized rules associated with the user,
   wherein the one or more customized rules comprise rules set by the transaction management computing device and one or more rules set by user based on user preferences for the selected payment card, and
   wherein the transaction management computing device ranks the customized rules based on user preferences, determines weights to assign to the rules based on the rankings, and applies a weighted combination of the rules to identify the attribute package for the transaction and selects the identified attribute package for the selected payment card.

2. The method of claim 1, wherein the location information is received from one or more of:
   an application running on the client device, one or more short-range radio frequency devices proximate to the client device, or one or more audio devices proximate to the client device.

3. The method of claim 1, further comprising:

receiving, by the transaction management computing device, a request to use a payment feature; and processing, by the transaction management computing device, the received request to use the payment feature.

4. The method of claim 3, wherein the payment feature is a cash-back feature, and wherein the method further comprises:

receiving, by the transaction management computing device, a cash-back amount;

communicating, by the transaction management computing device, the user transaction with a transaction amount including the cash-back amount; and initiating, by the transaction management computing device, the user transaction with a transaction amount including the cash-back amount.

5. The method of claim 3, wherein the payment feature is transactional tips, and wherein the method further comprises:

receiving, by the transaction management computing device, a tip amount; and initiating, by the transaction management computing device, the user transaction for a transaction amount including the tip amount.

6. The method of claim 3, wherein the payment feature is merchant rewards, and wherein the method further comprises:

receiving, by the transaction management computing device, a merchant reward identification;

identifying, by the transaction management computing device, a user;

identifying, by the transaction management computing device, a merchant reward account associated with the user; and transmitting, by the transaction management computing device, to at least one of a merchant or point-of-sale system the merchant reward account associated with the user.

7. The method of claim 6, further comprising:

retrieving, by the transaction management computing device, the merchant reward account associated with the user from a system associated with the merchant; and storing, by the transaction management computing device, the merchant reward account identified at a database of the system.

8. The method of claim 1, further comprising closing, by the transaction management computing device, the user transaction after the predetermined period of time has expired, wherein the user transaction is processed using the identified first attribute package.

9. The method of claim 1, further comprising sending, by the transaction management computing device, the identification of the first payment format and the first attribute package, wherein the identification causes the interface of the client device to display a prompt to the user, the prompt comprising a request for confirmation of the identified first attribute package and the identified first payment format or selection of the second attribute package or the second payment format.

10. The method of claim 1, further comprising:

receiving, by the transaction management computing device, a selection of the second payment format or the second attribute package, the selection being inputted by the user at the client device during the predetermined period of time;

modifying, by the transaction management computing device, a database based on the selection, wherein the modification of the database causes at least one of the following:

executing, by the transaction management computing device, the first attribute package selection code module in a subsequent transaction results in the selection of the second attribute package; or executing, by the transaction management computing device, the first payment format code module in a subsequent transaction involving the user results in the selection of the second payment format.

11. A non-transitory computer readable medium having stored thereon instructions for processing a transaction involving a merchant and a user using a system comprising machine executable code which when executed by at least one processor, causes the processor to perform:

receive over at least one communication channel, an indication of a user transaction;

determine location information indicating a location of the user transaction or merchant information indicating a merchant involved in the user transaction;

identify a first attribute package and a second attribute package different from the first attribute package of a plurality of attribute packages and a first payment format and a second payment format different from the first payment format of a plurality of payment formats, based on at least one or more customized rules associated with the user and the determined location information or the determined merchant information;

automatically display on an interface of a client device, in response to the identify, a selectable first icon that represents the first attribute package, a selectable second icon that represents the second attribute package, a selectable third icon that represents the first payment format, and a selectable fourth icon that represents the second payment format;

communicate an instruction to the client device to identify the selected first attribute package and the first payment format as a recommendation to the user;

initiate the user transaction upon receiving a confirmation indicating selection of the identified first payment format and the identified first attribute package; and hold the user transaction open for a predetermined period of time to allow the user to modify the selected first payment format to the second payment format or the selected first attribute package for the user transaction to the second attribute package, wherein the first and second attribute packages are connected with a selected payment card of the user based on one or more customized rules associated with the user, wherein the one or more customized rules comprise rules set by a transactional system and one or more rules set by user based on user preferences for the selected payment card, and wherein the transactional system ranks the customized rules based on user preferences, determines weights to assign to the rules based on the rankings, and applies a weighted combination of the rules to identify the attribute package for the transaction and selects the identified attribute package for the selected payment card.

12. The medium as set forth in claim 11, wherein the location information is received from one or more of:

an application running on the client device, one or more short-range radio frequency devices proximate to the client device, or one or more audio devices proximate to the client device.

13. The medium as set forth in claim 11, further comprising:
receive a request to use a payment feature;
process the received request to use the payment feature;
wherein the payment feature is a cash-back feature, and further comprises:
receive a cash-back amount;
communicate an instruction to provide the user with cash back based on the cash-back amount;
initiate the user transaction with a transaction amount including the cash-back amount;
wherein the payment feature is transactional tips, and further comprises:
receive a tip;
initiate the user transaction for a transaction amount including the tip amount; and
wherein the payment feature is merchant rewards, and further comprises:
receive a merchant reward identification;
identify a user;
identify a merchant reward account associated with the user; and
transmit to at least one of a merchant or point-of-sale system the merchant reward account associated with the user.

14. The medium as set forth in claim 13, further comprising:
retrieve the merchant reward account associated with the user from a system associated with the merchant; and
store the merchant reward account identified at a database of the system.

15. The medium as set forth in claim 11, further comprising:
close the user transaction after the predetermined period of time has expired, wherein the user transaction is processed using the identified first attribute package;
send the identification of the first payment format and the first attribute package, wherein the identification causes the client device to display a prompt to the user, the prompt comprising a request for confirmation of the identified first attribute package and identified first payment format or selection of the second attribute package or the second payment format;
receive a selection of the second payment format or the second attribute package, the selection being inputted by the user at the client device during the predetermined period of time;
modify a database based on the selection, wherein the modification of the database causes at least one of the following:
execute the first attribute package selection code module in a subsequent transaction results in the selection of the second attribute package; or
execute the first payment format code module in a subsequent transaction involving the user results in the selection of the second payment format.

16. A transaction management computing device comprising one or more processors coupled to a memory and configured to execute programmed instructions stored in the memory to:
receive over at least one communication channel, an indication of a user transaction;
determine location information indicating a location of the user transaction or merchant information indicating a merchant involved in the user transaction;
identify a first attribute package and a second attribute package different from the first attribute package of a plurality of attribute packages and a first payment format and a second payment format different from the first payment format of a plurality of payment formats, based on at least one on one or more customized rules associated with the user and the determined location information or the determined merchant information;
automatically display on an interface of a client device, in response to the identify, a selectable first icon that represents the first attribute package, a selectable second icon that represents the second attribute package, a selectable third icon that represents the first payment format, and a selectable fourth icon that represents the second payment format;
communicate an instruction to the client device to identify the selected first attribute package and the first payment format as a recommendation to the user;
initiate the user transaction upon receiving a confirmation indicating selection of the identified first payment format and the identified first attribute package; and
hold the user transaction open for a predetermined period of time to allow the user to modify the selected first payment format to the second payment format or the selected first attribute package to the second attribute package for the user transaction,
wherein the first and second attribute packages are connected with a selected payment card of the user based on one or more customized rules associated with the user,
wherein the one or more customized rules comprise rules set by a transactional system and one or more rules set by user based on user preferences for the selected payment card, and
wherein the transactional system ranks the customized rules based on user preferences, determines weights to assign to the rules based on the rankings, and applies a weighted combination of the rules to identify the attribute package for the transaction and selects the identified attribute package for the selected payment card.

17. The device as set forth in claim 16, wherein the location information is received from one or more of:
an application running on the client device, one or more short-range radio frequency devices proximate to the client device, or one or more audio devices proximate to the client device.

18. The device as set forth in claim 16, wherein the one or more processors are further configured to execute one or more additional programmed instructions stored in the memory to:
receive a request to use a payment feature;
process the received request to use the payment feature;
wherein the payment feature is a cash-back feature, and further comprises:
receive a cash-back amount;
communicate an instruction to provide the user with cash back based on the cash-back amount;
initiate the user transaction with a transaction amount including the cash-back amount;
wherein the payment feature is transactional tips, and further comprises:
receive a tip amount;
initiate the user transaction for a transaction amount including the tip amount; and wherein the payment feature is merchant rewards, and further comprises:
  receive a merchant reward identification;
  identify a user;
  identify a merchant reward account associated with the user; and
  transmit to at least one of a merchant or point-of-sale system the merchant reward account associated with the user.

19. The device as set forth in claim 18, wherein the one or more processors are further configured to execute one or more additional programmed instructions stored in the memory to:
  retrieve the merchant reward account associated with the user from a system associated with the merchant; and
  store the merchant reward account identified at a database of the system.

20. The device as set forth in claim 16, wherein the one or more processors are further configured to execute one or more additional programmed instructions stored in the memory to:
  close the user transaction after the predetermined period of time has expired, wherein the user transaction is processed using the identified first attribute package;
  send the identification of the first payment format and the first attribute package, wherein the identification causes the client device to display a prompt to the user, the prompt comprising a request for confirmation of the identified first attribute package and identified first payment format or selection of the second attribute package or the second payment format;
  receive a selection of the second payment format or the second attribute package, the selection being inputted by the user at the client device during the predetermined period of time;
  modify a database based on the selection, wherein the modification of the database causes at least one of the following:
    execute the first attribute package selection code module in a subsequent transaction results in the selection of the second attribute package; or
    execute the first payment format code module in a subsequent transaction involving the user results in the selection of the second payment format.

* * * * *